(12) United States Patent
Hasegawa et al.

(10) Patent No.: US 8,654,320 B2
(45) Date of Patent: Feb. 18, 2014

(54) BEAM PATH MONITORING DEVICE AND BEAM PATH MONITORING SYSTEM

(75) Inventors: Takemi Hasegawa, Yokohama (JP); Tetsuya Hayashi, Yokohama (JP); Haruo Nakaji, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 485 days.

(21) Appl. No.: 12/995,252

(22) PCT Filed: May 25, 2009

(86) PCT No.: PCT/JP2009/059498
§ 371 (c)(1),
(2), (4) Date: Nov. 30, 2010

(87) PCT Pub. No.: WO2009/147963
PCT Pub. Date: Dec. 10, 2009

(65) Prior Publication Data
US 2011/0102776 A1 May 5, 2011

(30) Foreign Application Priority Data

Jun. 2, 2008 (JP) ................................. 2008-144903
Feb. 2, 2009 (JP) ................................. 2009-021442

(51) Int. Cl.
*G01N 21/00* (2006.01)

(52) U.S. Cl.
USPC ........................................................ 356/73.1

(58) Field of Classification Search
CPC ...................... G01M 11/3136; G01M 11/3145
USPC ........................................................ 356/73.1
See application file for complete search history.

(56) References Cited

U.S. PATENT DOCUMENTS 4,812,038 A * 3/1989 Nazarathy et al. ........... 356/73.1

5,268,738 A * 12/1993 Baney et al. .................. 356/479
(Continued)

FOREIGN PATENT DOCUMENTS

JP    4-265834    9/1992
(Continued)

OTHER PUBLICATIONS

T. Saida et al., "High-Spatial Resolution Reflectometry by Synthesis of Optical Coherence Function for Measuring Reflectivity Distribution at a Long Distance," IEEE Photonics Technology Letters, Apr. 1, 1998, pp. 573-575, vol. 10, No. 4.
Anonymous,"Optical Time Domain Reflectometers," Agilent Technologies, Mar. 21, 2002, pp. 1-96, XP55008800.
(Continued)

*Primary Examiner* — Gregory J Toatley
*Assistant Examiner* — Rufus Phillips
(74) *Attorney, Agent, or Firm* — Drinker Biddle & Reath LLP

(57) ABSTRACT

An optical line monitoring apparatus and optical line monitoring system which can measure a reflectance distribution in an optical line with a high spatial resolution in a short time are provided. An optical line monitoring apparatus 14A provided in a station 10A comprises an OCDR measurement section 15 for carrying out OCDR measurement, an OTDR measurement section 16 for carrying out OTDR measurement, an optical switch 13 for selectively connecting one of the OCDR measurement section 15 and OTDR measurement section 16 to the optical coupler 12, a control section 17, and a storage device 18. The control section 17 performs a predetermined arithmetic operation according to an OCDR measurement result acquired by causing the OCDR measurement section 15 to carry out the OCDR measurement and an OTDR measurement result acquired by causing the OTDR measurement section 16 to carry out the OTDR measurement.

7 Claims, 13 Drawing Sheets

(56) References Cited

U.S. PATENT DOCUMENTS 6,046,797 A * 4/2000 Spencer et al. ............ 356/73.1
6,407,373 B1 * 6/2002 Dotan ....................... 250/201.3

FOREIGN PATENT DOCUMENTS

| JP | 10-148596 | 6/1998 |
| JP | 2002-139403 | 5/2002 |
| JP | 2006-184038 | 7/2006 |

OTHER PUBLICATIONS

Kazuo Hotate et al., "Synthesis of Optical-Coherence Function and Its Applications in Distributed and Multiplexed Optical Sensing," Journal of Lightwave Technology, Jul. 2006, pp. 2541-2557, vol. 24, No. 7.

Zuyuan He et al., "Distributed Fiber-Optic Stress-Location Measurement by Arbitrary Shaping of Optical Coherence Function," Journal of Lightwave Technology, Sep. 2002, pp. 1715-1723, vol. 20, No. 9.

* cited by examiner (a)
DIRECT MODULATION SIGNAL A (b)
EXTERNAL MODULATION SIGNAL B (c)
MONITOR LIGHT GATE SIGNAL C (d)
ELECTRIC SIGNAL GATE SIGNAL D (a)

CORRELATION BETWEEN MONITOR LIGHT
AND REFERENCE LIGHT (b)

OVERLAP (PULSE WINDOW) BETWEEN MONITOR LIGHT GATE
AND ELECTRIC SIGNAL GATE (c)

REFLECTED LIGHT DETECTION SENSITIVITY (a)
INTERFERENCE SIGNAL
BY REFLECTED LIGHT AT POSITION $Z_1$ (b)
INTERFERENCE SIGNAL
BY REFLECTED LIGHT AT POSITION $Z_2$

BEAM PATH MONITORING DEVICE AND BEAM PATH MONITORING SYSTEM

TECHNICAL FIELD

The present invention relates to an optical line monitoring apparatus and an optical line monitoring system which measure a reflectance distribution in an optical line by utilizing an optical reflectometry technique, thereby monitoring the optical line.

BACKGROUND ART

In optical communication systems which carry out optical communications by using optical fiber lines, it is important to detect failures such as breaks in the optical fiber lines and increases in transmission loss. In particular, when a failure occurs in an optical fiber line or subscriber terminal in subscriber optical communication systems which have been becoming widespread in recent years, it is required for them to rapidly specify the position of failure and repair the failure.

Therefore, the optical communication systems are provided with optical line monitoring apparatus for detecting such failures. The optical line monitoring apparatus, which utilize optical reflectometry techniques, determine a reflectance distribution in an optical line such as an optical fiber line according to reflected light (constituted by Fresnel reflected light and Rayleigh scattering light) occurring when monitor light propagates through the optical line, thereby detecting a position of failure in the optical line. It has been required for such optical line monitoring apparatus to measure the reflectance distribution with a high spatial resolution.

Known as an optical reflectometry technique is OTDR (Optical Time Domain Reflectometry) which measures a reflectance distribution according to temporal changes in intensity of reflected light occurring when pulsed monitor light propagates through an optical line. As another optical reflectometry technique, OCDR (Optical Coherence Domain Reflectometry) has been known (see Patent Literature 1 and Non Patent Literatures 1 and 2).

The OCDR generates monitor light whose optical frequency is modulated such as to yield a comb-teeth-shaped optical coherence function, inputs reflected light occurring when the monitor light propagates through an optical line, inputs reference light taken out as a branch of the monitor light, and measures a reflectance at a specific position of the optical line by utilizing the fact that the magnitude of interference between the reflected light and reference light depends on the delay time difference therebetween. Further, while changing positions for measuring the reflectance by altering a period of optical frequency modulation in the monitor light and so forth, the OCDR determines a reflectance distribution in the optical line.

The optical coherence function is obtained by normalizing an autocorrelation function $<V(t)\cdot V^*(t-\tau)>$ of an electric field $V(t)$ of light, which is a function including time $t$ as a variable, with optical intensity, i.e., by normalizing a Fourier transform of an optical power spectrum with optical intensity. Assuming that light having an electric field $V(t)$ is split into two and that the delay time difference between the resulting two branches of light is $\tau$, the magnitude of interference fringes between the two branches of light is represented by the real part of the optical coherence function. The absolute value of the optical coherence function is also known as degree of coherence and indicates the magnitude of interference.

The monitor light used in the OCDR, which is one whose optical frequency is modulated, has a comb-teeth-shaped optical coherence function. In a specific example, light whose optical frequency is modulated at fixed time intervals into $f_0$, $f_0+f_s$, $f_0-f_s$, $f_0+2f_s$, $f_0-2f_s$, $f_0+3f_s$, $f_0-3f_s$, ... in this order is employed as the monitor light. In another example, light whose optical frequency is modulated into a sine wave at a modulation frequency of $f_s$ is used as the monitor light. The optical coherence function of the monitor light whose optical frequency is thus modulated has a peak (coherence peak) shaped similar to a delta function when $f_s\tau$ is an integer. Hence, these kinds of monitor light have a comb-teeth-shaped coherence function. The position of the coherence peak varies as $f_s$ changes.

The comb-teeth-shaped coherence function has a plurality of coherence peaks arranged at a period of $1/f_s$. A gate having a time width shorter than the period ($1/f_s$) of coherence peaks is applied to the monitor light such that one of the coherence peaks exists in a segment to be measured in an optical line, whereby a pulse of the monitor light is cut out.

CITATION LIST

Patent Literature
 Patent Literature 1: Japanese Patent Application Laid-Open No. 10-148596
Non Patent Literature
 Non Patent Literature 1: K. Hotate and Z. He, Journal of Lightwave Technology, vol. 24, pp. 2541-2557 (2006)
 Non Patent Literature 2: Z. He and K. Hotate, Journal of Lightwave Technology, vol. 20, pp. 1715-1723 (2002)

SUMMARY OF INVENTION

Technical Problem

For attaining a high spatial resolution in the OTDR, it is necessary for the monitor light to narrow its pulse width. When the pulse width of the monitor light is narrowed, it is necessary for the monitor light to raise its power in order to compensate for a decrease in the signal to noise ratio (SNR) of measurement which is caused by the lowering of energy of the monitor light. When the power of the monitor light is raised, however, there is a possibility of nonlinear optical phenomena such as stimulated Brillouin scattering occurring in the optical line, thereby lowering measurement performances and interfering with communication signals. Therefore, the spatial resolution is limited to about several meters in the OTDR.

On the other hand, the OCDR can attain a spatial resolution higher than that of the OTDR. For example, Non Patent Literature 1 discloses that a reflection point at a distance of 5 km can be measured with a spatial resolution of 19 cm.

The OCDR, however, cannot detect Rayleigh scattering light continuously occurring along the optical line. This is because practicable modulation techniques cannot suppress side lobes (portions other than the coherence peaks) of the optical coherence function to zero, so that reflected light components from two different positions cannot be separated strictly from each other, whereby strong reflected light occurring at connection points and the like in the optical line may cause noise to bury the Rayleigh scattering light. Therefore, the OCDR can detect discrete reflection points on the optical line, but cannot detect the Rayleigh scattering light occurring in a segment between the reflection points and thus can only attain fragmentary information of the optical line, whereby its failure detecting capability is insufficient.

The OCDR may also be problematic in that its measurement time becomes longer. This is because it requires measurement points by at least a number greater than the quotient of the measurement distance divided by the spatial resolution. The OCDR typically requires a measurement time of about 1 ms per measurement point, since an electric signal obtained by detecting reflected light is detected through a filter. Therefore, it takes a time of about 200 seconds when an optical line having a practical length of 20 km is to be measured with a spatial resolution of about 10 cm. As the spatial resolution is improved further, the measurement time becomes longer.

For overcoming the problems mentioned above, it is an object of the present invention to provide an optical line monitoring apparatus and optical line monitoring system which can measure a reflectance distribution in an optical line with a high spatial resolution in a short time.

Solution to Problem

The optical line monitoring apparatus in accordance with the present invention comprises (1) first measurement means for propagating first monitor light through an optical line, receiving first reflected light occurring when the first monitor light propagates, and acquiring a reflectance distribution along a light propagation direction in the optical line as a first measurement result by OTDR or OCDR; (2) second measurement means for propagating second monitor light through the optical line, receiving second reflected light occurring when the second monitor light propagates, and acquiring a reflectance distribution along the light propagation direction in the optical line as a second measurement result by OCDR; and (3) a control section for causing the first measurement means to acquire the first measurement result with a first spatial resolution and then causing the second measurement means to acquire the second measurement result in the range of a portion of the optical line, which is determined according to the first measurement result, with a second spatial resolution smaller than the first spatial resolution.

Preferably, the control section determines a position of a discrete reflection point in the optical line according to the second measurement result, obtains a degree of contribution of reflection at the discrete reflection point to the first measurement result according to the determined position of the discrete reflection point and the first spatial resolution, corrects the first measurement result according to the obtained degree of contribution, and outputs the corrected result. Preferably, a light source section for outputting the first monitor light in the first measurement means and a light source section for outputting the second monitor light in the second measurement means include a common part. Preferably, a detection section for receiving the first monitor light in the first measurement means and a detection section for receiving the second monitor light in the second measurement means include a common part.

The optical line monitoring system in accordance with the present invention is a system for monitoring an optical communication system for carrying out an optical communication between station- and subscriber-side terminals optically connected to each other with an optical line, the optical line monitoring system comprising an optical coupler provided in the optical line and the above-mentioned optical line monitoring apparatus in accordance with the present invention optically connected to the optical coupler; wherein the first or second monitor light selectively issued from the optical line monitoring apparatus is caused to propagate to the optical line through the optical coupler; and wherein the first or second reflected light is fed into the optical line monitoring apparatus through the optical coupler.

Preferably, the station-side terminal is optically connected to a plurality of subscriber terminals through an optical splitter, while the optical coupler is provided in the optical line between the station-side terminal and the optical splitter. Preferably, each of the plurality of subscriber terminals includes a reflection filter for wavelength-selectively reflecting the first monitor light and second monitor light.

Advantageous Effects of Invention

The present invention can measure a reflectance distribution in an optical line with a high spatial resolution in a short time.

DESCRIPTION OF EMBODIMENTS

In the following, modes for carrying out the present invention will be explained in detail with reference to the accompanying drawings. In the explanation of the drawings, the same constituents will be referred to with the same signs while omitting their overlapping descriptions.

First Embodiment

Figure 1:
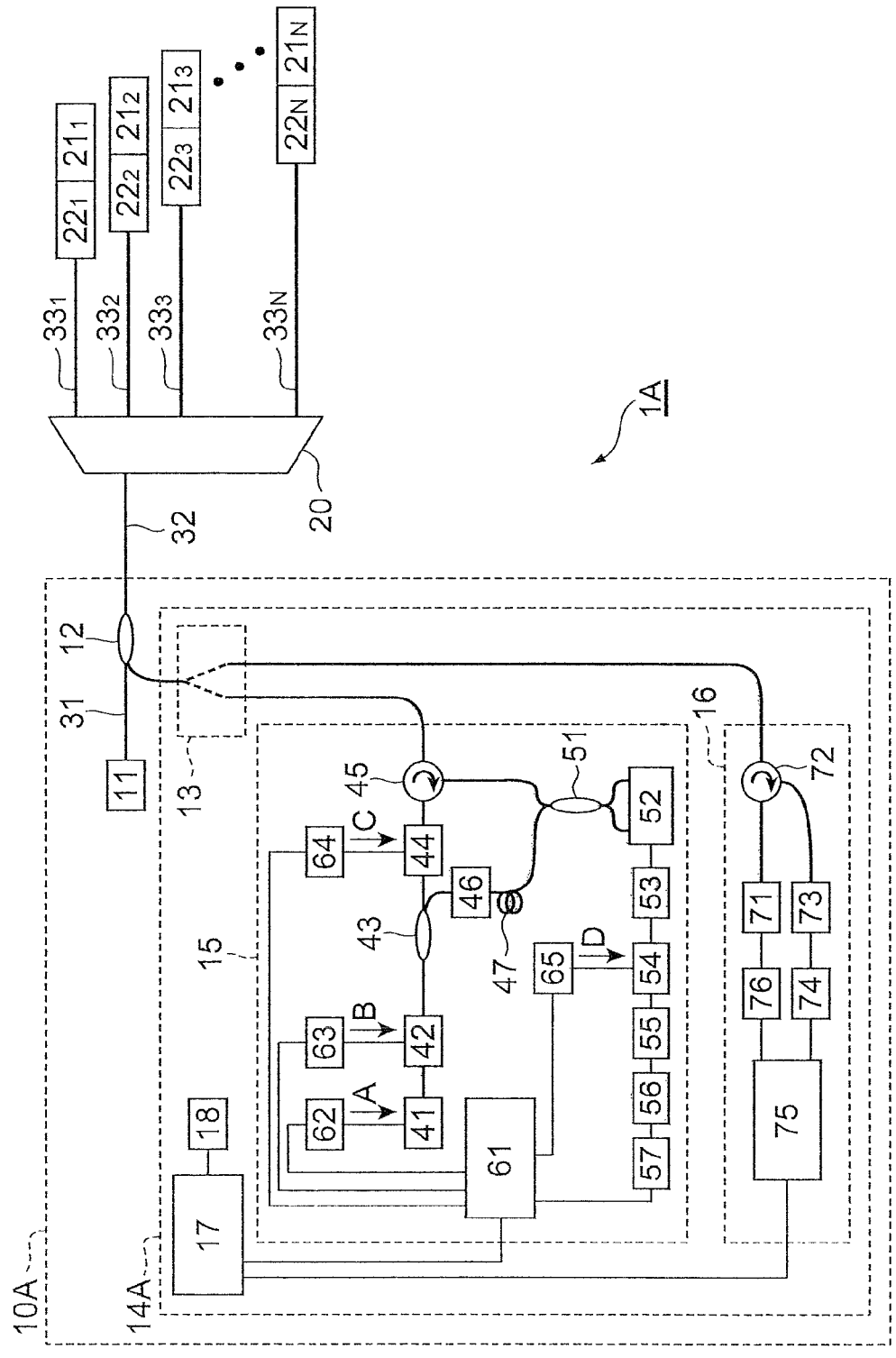
[FIG. 1] is a view illustrating an optical line monitoring system 1A equipped with an optical line monitoring apparatus 14A in accordance with a first embodiment.

FIG. 1 is a view illustrating an optical line monitoring system 1A equipped with an optical line monitoring apparatus 14A in accordance with the first embodiment. The optical line monitoring system 1A illustrated in this drawing is one in which a station-side terminal 11 provided in a station 10A is optically connected to N subscriber terminals $21_1$ to $21_N$ with optical fiber lines through an optical splitter 20, so as to carry out optical communications between the station-side terminal 11 and each subscriber terminal $21_n$. Here, N is an integer of 2 or more, while n is an integer of at least 1 but no more than N. Such a mode of optical communication systems is known as PON (Passive Optical Network). The number of branches N is typically 4 to 32.

The station 10A is provided with an optical coupler 12 and an optical line monitoring apparatus 14A in addition to the station-side terminal 11. The station-side terminal 11 and the optical coupler 12 are optically connected to each other with an optical fiber line 31. The optical line monitoring apparatus 14A is also optically connected to the optical coupler 12. The optical coupler 12 and the optical splitter 20 are optically connected to each other with a first optical line 32. The optical splitter 20 and each subscriber terminal $21_n$ are optically connected to each other with a second optical line $33_n$. Each of the first and second optical lines 32, $33_n$ is a line constituted by an optical fiber, preferably by a single-mode optical fiber compliant with ITU-T G.652.

Preferably, an optical filter $22_n$ which transmits communication light but reflects monitor light is attached to an end of each subscriber terminal $21_n$ to be connected to the optical line. Since light having a wavelength of 1.26 to 1.62 µm is used as the communication light in general, light in a 1.65-µm wavelength band (1.64 to 1.66 µm) is preferably employed as the monitor light, whereby each optical filter $22_n$ is preferably a filter which selectively reflects light in the 1.65-µm wavelength band. Such an optical filter can be achieved by a fiber grating and the like.

The optical line monitoring apparatus 14A comprises an OCDR measurement section 15 for carrying out OCDR measurement, an OTDR measurement section 16 for carrying out OTDR measurement, an optical switch 13 for selectively connecting one of the OCDR measurement section 15 and OTDR measurement section 16 to the optical coupler 12, a control section 17, and a storage device 18. The optical line monitoring apparatus 14A monitors the PON system (first optical line 32, optical splitter 20, second optical line $33_n$, optical filter $22_n$, and subscriber terminal $21_n$) to be measured.

While one of the OCDR measurement section 15 and OTDR measurement section 16 is connected to one PON system, the other may be connected to another PON system, whereby the measurement sections can increase their availability, so as to include a plurality of PON systems in objects to be monitored, by which the monitoring cost per subscriber can be reduced.

The OCDR measurement section 15 comprises a light source 41, an intensity modulator 42, an optical splitter 43, a monitor light gate section 44, an optical circulator 45, a polarization modulator 46, a delay optical fiber 47, an optical coupler 51, a balance detector 52, a first filter 53, an electric signal gate section 54, a second filter 55, an RF detector 56, an A/D converter 57, a control section 61, and signal generators 62 to 65.

The light source 41 is one which can modulate an optical frequency of output light; its examples include semiconductor DFB laser light sources and semiconductor laser light sources equipped with external resonators. The light source 41 inputs therein a periodical direct modulation signal A issued from the signal generator 62 and outputs light whose optical frequency is periodically modulated according to the direct modulation signal A. The output light from the light source 41 has a comb-teeth-shaped optical coherence function.

The intensity modulator 42 inputs therein a periodical external modulation signal B issued from the signal generator 63, modulates the intensity of the output light from the light source 41 according to the external modulation signal B, and outputs thus modulated light. The external modulation signal B is a periodical signal that is synchronized with the direct modulation signal A. The output light from the intensity modulator 42 is one whose optical spectrum is modified by the intensity modulation, whereby the noise included in the optical coherence function is reduced.

The optical splitter 43 inputs therein light which is emitted from the light source 41 and intensity-modulated as necessary by the intensity modulator 42, splits the input light into two, i.e., monitor light and reference light, and outputs the monitor light and reference light to the monitor light gate section 44 and polarization modulator 46, respectively.

The monitor light gate section 44 inputs therein the monitor light issued from the optical splitter 43 and a monitor light gate signal C issued from the signal generator 64. The monitor light gate signal C is a periodical signal having a pulse with a gate width w1 at a fixed period T. The gate width w1 of the monitor light gate signal C substantially equals each of modulation periods of the direct modulation signal A and external modulation signal B. To the optical circulator 45, only for a period of the pulse of such monitor light gate signal C having the gate width w1, the monitor light gate section 44 outputs the monitor light issued from the optical splitter 43.

The optical circulator 45 inputs therein the pulsed monitor light issued from the monitor light gate section 44 and then outputs it to the optical coupler 12. The optical circulator 45 inputs therein the light having arrived from the optical coupler 12 and then outputs it to the optical coupler 51.

The monitor light issued from the optical circulator 45 is sent to the first optical line 32 through the optical switch 13 and optical coupler 12 and travels the first optical line 32, optical splitter 20, and second optical line $33_n$, thereby reaching the optical filter $22_n$. The reflected light (such as Fresnel reflected light and Rayleigh scattering light) occurring when the monitor light propagates travels the reverse of the propagation path of the monitor light, so as to enter the optical coupler 51 through the optical coupler 12, optical switch 13, and optical circulator 45. Here, the optical filter $22_n$ arranged between an end of each second optical line $33_n$ and its corresponding subscriber terminal $21_n$ can detect the reflected light occurring when the monitor light is reflected at the time of OTDR measurement and OCDR measurement, thereby sensing abnormalities such as breaks in optical lines.

It will be preferred in particular if the reflectance R [dB] of the optical filter satisfies the following expression (1), where N is the number of branches of the optical splitter. Here, R0, which is typically −40 dB, is the internal reflectance of the optical circulator 45, optical coupler 12, first optical line 32, and optical splitter 20. When expression (1) is satisfied, the power of reflected light reaching the monitoring apparatus after being reflected by the optical filter $22_n$ becomes greater than the power of reflected light generated by unintentional reflection on the upstream side (monitoring apparatus side) of the optical splitter 20, so as to relatively reduce the influence of noise caused by unintentional reflection on the upstream side, thereby shortening the measurement time.

$$R > R0 + 20 \log_{10}(N) \quad (1)$$

Preferably, the optical path of reference light between the optical splitter 43 and optical coupler 51 is provided with the delay optical fiber 47. The delay optical fiber 47 sets a delay time between the reflected light (return light of the monitor light) fed into the optical coupler 51 from the optical circulator 45 and the reference light fed into the optical coupler 51 from the optical splitter 43. Preferably, the length of the delay optical fiber 47 is set such that the delay time between the reflected light generated by the monitor light reflected at a given position within a measurement distance range and the reference light becomes longer than the coherence time of the output light of the light source 41. The spatial resolution degrades with increase in the delay time within a range where the delay time is shorter than the coherence time, and becomes substantially a fixed value within a range where the delay time is longer than the coherence time. Hence, setting the delay time as mentioned above can reduce fluctuations in the spatial resolution within the measurement range.

It will also be preferred if the optical path of reference light between the optical splitter 43 and optical coupler 51 is provided with the polarization modulator 46. The polarization modulator 46 inputs therein the reference light issued from the optical splitter 43 and outputs it after changing its state of polarization. When detecting the reflected light (return light of the monitor light) and reference light interfering with each other, their efficiency of detection depends on the relative relationship between the polarization states of these two kinds of light. Therefore, it will be preferred if measurement is carried out while changing the polarization state of at least one of the reflected light and reference light, and results of the measurement in a plurality of polarization states are subjected to an arithmetic operation such as averaging, so as to yield measurement results independent of polarization states.

The optical coupler 51 inputs therein the reflected light (return light of the monitor light) issued from the optical circulator 45 and the reference light having traveled the polarization modulator 46 and delay optical fiber 47 after exiting the optical splitter 43, combines thus fed reflected light and reference light, and outputs the combined light to the balance detector 52. As the optical coupler 51, a 3-dB coupler is employed, for example.

The balance detector 52 inputs therein the reflected light and reference light combined by the optical coupler 51 and outputs an electric signal indicating the intensity of interference light formed by the reflected light and reference light interfering with each other to the first filter 53. Hence, the balance detector 52 acts as a photoelectric conversion section which outputs an electric signal having a value corresponding to the intensity of the interference light.

The first filter 53 inputs therein the electric signal issued from the balance detector 52, removes unnecessary noise included in the electric signal, and outputs the remaining electric signal to the electric signal gate section 54. Preferably, the first filter 53 is one which removes the DC component of the electric signal fed thereto. Causing the first filter 53 to remove the DC component noise, which is generated by errors in the balance in the optical coupler 51 and balance detector 52, can reduce the amount of noise occurring in the electric signal gate section 54 in the subsequent stage.

The electric signal gate section 54 inputs not only the electric signal having passed the first filter 53 after exiting the balance detector 52, but also an electric signal gate signal D issued from the signal generator 65. The electric signal gate signal D is a periodical signal having a pulse with a gate width w2 at a fixed period T. The period T of the electric signal gate signal D substantially equals that of the monitor light gate signal C. The pulse center of the electric signal gate signal D is delayed by a delay time d than the pulse center of the monitor light gate signal C.

To the second filter 55, only for a period of the pulse of such electric signal gate signal D having the gate width w2, the electric signal gate 54 outputs the electric signal issued from the first filter 53. The electric signal fed from the electric signal gate section 54 to the second filter 55 becomes a pulse signal. Employed as the electric signal gate section 54 is an operational amplifier circuit which turns ON/OFF according to the level of the electric signal gate signal D.

The second filter 55 inputs therein the pulsed electric signal issued from the electric signal gate section 54 and selectively outputs portions of thus fed electric signal which fall within a specific frequency band to the RF detector 56. Preferably, the specific frequency band does not include a frequency of (where n is a natural number) which is an integral multiple of the repetition frequency f ($=1/T$) of the electric signal gate signal D. It will be preferred in particular if the specific frequency band includes a frequency which is half an odd multiple of f ($=1/T$) and has a bandwidth of f/2 or less. The signal fed into an electric signal gate section carries noise at frequencies of DC and integral multiples of 1/p, whereby the noise diffuses to frequencies of integral multiples of f as it passes the electric signal gate section. Setting the frequency band as mentioned above, however, can reduce the influence of the noise occurring in the electric signal gate section 54, so as to improve the SNR of the measurement, thereby shortening the measurement time.

The RF detector 56 inputs therein the electric signal issued from the second filter 55, converts it into an electric signal corresponding to the magnitude of the interference component, and outputs the resulting signal to the A/D converter 57. The A/D converter 57 inputs therein the electric signal issued from the RF detector 56, converts this electric signal (analog signal) to a digital signal, and outputs the digital signal to the control section 61. The value of the digital signal indicates the power of reflected light generated at the position z on the optical line determined by the period p of the optical frequency modulation in the light source 41 and the gate delay time d.

The control section 61 inputs therein the digital value issued from the A/D converter 57 and stores the digital value and the position z in association with each other. The control section 61 controls the signal generators 62 to 65, so as to designate the modulation period p of the direct modulation signal A issued from the signal generator 62, the modulation period p of the external modulation signal B issued from the signal generator 63, the period T and gate width w1 of the monitor light gate signal C issued from the signal generator 64, the period T and gate width w2 of the electric signal gate signal D issued from the signal generator 65, and the gate delay time d. As a consequence, the control section 61 designates the measurement position z on the optical line that is an object to be measured, and acquires the digital value indicating the power of the reflected light generated at this position z from the A/D converter 57. Then, the control section 61 determines a reflectance distribution along the monitor light propagation direction in the optical line.

The OTDR measurement section 16 comprises a light source 71, an optical circulator 72, a photodetector 73, an A/D converter 74, a control section 75, and a signal generator 76.

The light source 71 is one which inputs therein a pulse signal issued from the signal generator 76 and generates pulsed monitor light as being driven by the pulse signal; for example, a semiconductor laser can be used therefor. The optical circulator 72 inputs therein the monitor light emitted from the light source 71 and outputs the monitor light to the optical coupler 12. The optical circulator 72 also inputs therein light having arrived from the optical coupler 12 and outputs it to the photodetector 73.

The photodetector 73 detects the light fed from the optical circulator 72 and outputs an electric signal corresponding to the optical intensity of the light. The electric signal varies with time, and its change reflects the distribution of reflectance along the optical line. The A/D converter 74 inputs the electric signal from the photodetector 73, sequentially converts the electric signal (analog signal) to digital signals, and outputs the resulting signals as a digital signal series to the control section 75. The control section 75 inputs therein the digital signal series issued from the A/D converter 74 and records it as an OTDR measurement result.

The control section 17 is connected to the control section 61 of the OCDR measurement section 15 and the control section 75 of the OTDR measurement section 16, outputs measurement conditions such as a measurement range to the control sections 61, 75, and inputs measurement result data from the control sections 61, 75. The control section 17 is connected to the storage device 18. The storage device 18 stores information such as the distance from the monitoring apparatus to each optical filter $22_n$ and positions (names of buildings, positions within the buildings, etc.) where the optical filters $22_n$ and subscriber terminals $21_n$ are placed.

The control section 17 detects a peak of the reflectance derived from each optical filter $22_n$ within the reflectance distribution, compares the information about the distance to the optical filter $22_n$ prepared beforehand with the distance to the reflectance peak, and determines whether or not the reflected light from the optical filter $22_n$ is detected. When a subscriber terminal in which reflected light is detected and a subscriber terminal in which no reflected light is detected coexist, the control section 17 determines that an abnormality such as a break exists in the subscriber-side optical fiber to which the latter subscriber terminal belongs, and displays the abnormality.

By carrying out the OCDR measurement only in the vicinity of the optical filter $22_n$ according to the information about the distance to the optical filter $22_n$, the control section 17 can find whether or not reflected light from the optical filter $22_n$ exists and the magnitude of reflectance, thereby shortening the time for determining whether or not there is an abnormality in the second optical line $33_n$ to which the optical filter $22_n$ belongs.

Further, according to the OCDR measurement result acquired by causing the OCDR measurement section 15 to carry out the OCDR measurement and the OTDR measurement result acquired by causing the OTDR measurement section 16 to carry out the OTDR measurement, the control section 17 performs a predetermined arithmetic operation which will be explained later.

The direct modulation signal A, the external modulation signal B, the monitor light gate signal C, the electric signal gate signal D, the electric signal issued from the RF detector 56, and the like will now be explained with reference to FIGS. 2 to 4.

Figure 2:
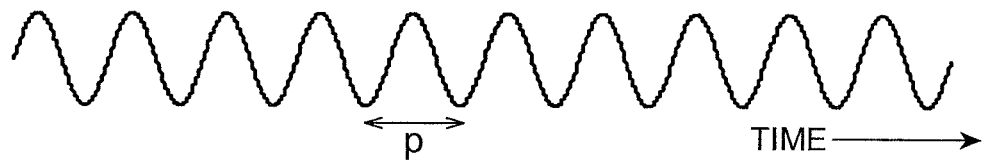
[FIG. 2] is a chart illustrating respective waveforms of a direct modulation signal A, an external modulation signal B, a monitor light gate signal C, and an electric signal gate signal D.
Figure 2:
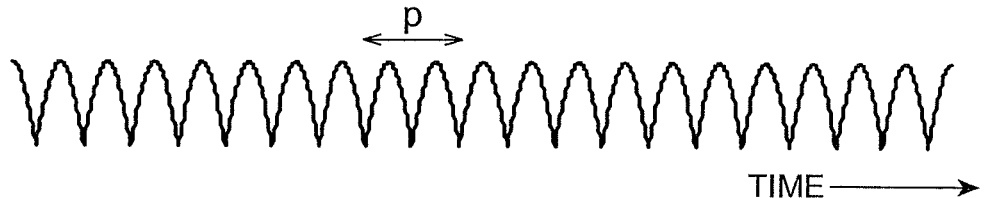
Figure 2:
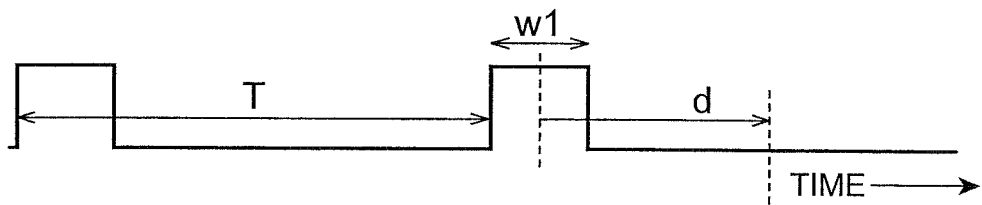
Figure 2:
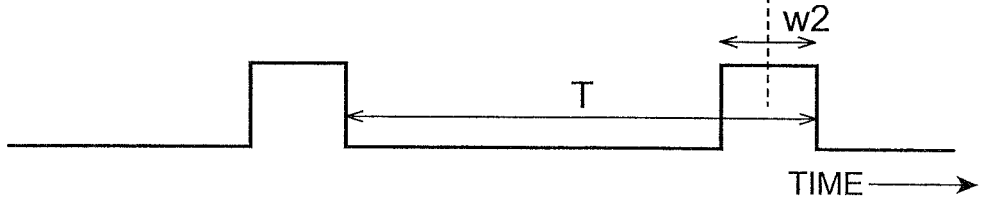

FIG. 2 is a chart illustrating respective waveforms of the direct modulation signal A, external modulation signal B, monitor light gate signal C, and electric signal gate signal D. FIG. 2(a) illustrates the waveform of the direct modulation signal A fed from the signal generator 62 to the light source 41. FIG. 2(b) illustrates the waveform of the external modulation signal B fed from the signal generator 63 to the intensity modulator 42. FIG. 2(c) illustrates the waveform of the monitor light gate signal C fed from the signal generator 64 to the monitor light gate section 44. FIG. 2(d) illustrates the waveform of the electric signal gate signal D fed from the signal generator 65 to the electric signal gate section 54.

Figure 3:
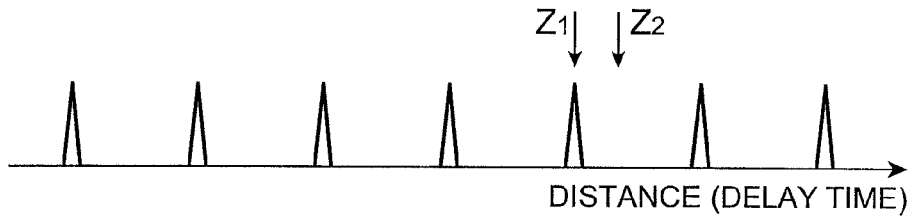
[FIG. 3] is a chart illustrating a correlation magnitude between reflected light (returning monitor light) and reference light, an overlap (pulse window) between the monitor light gate signal C and electric signal gate signal D, and a sensitivity of detecting the reflected light in relation to a position z on the optical line.
Figure 3:
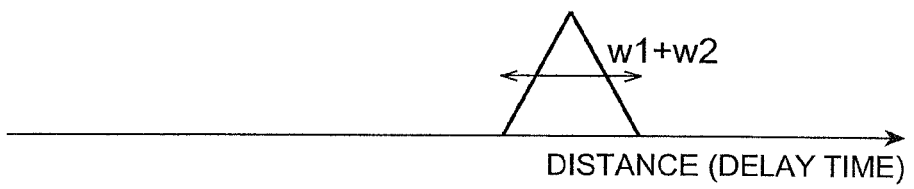
Figure 3:

FIG. 3 is a chart illustrating a correlation magnitude between the reflected light (returning monitor light) and reference light, an overlap (pulse window) between the monitor light gate signal C and electric signal gate signal D, and a sensitivity of detecting the reflected light in relation to the position z on the optical line. FIG. 3(a) illustrates a correlation magnitude distribution of the reflected light (returning monitor light) and reference light. FIG. 3(b) illustrates the overlap (pulse window) between the monitor light gate signal C and electric signal gate signal D. FIG. 3(c) illustrates a reflected light detection sensitivity distribution.

Figure 4:
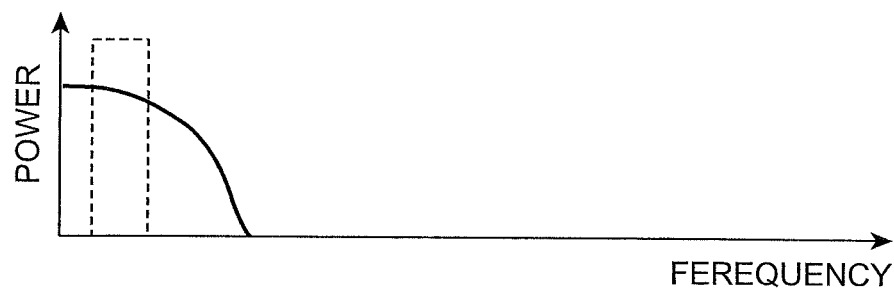
[FIG. 4] is a chart illustrating respective spectra of interference signals caused by reflected light from positions z1, z2 in the optical line shown in FIG. 3(a)
Figure 4:
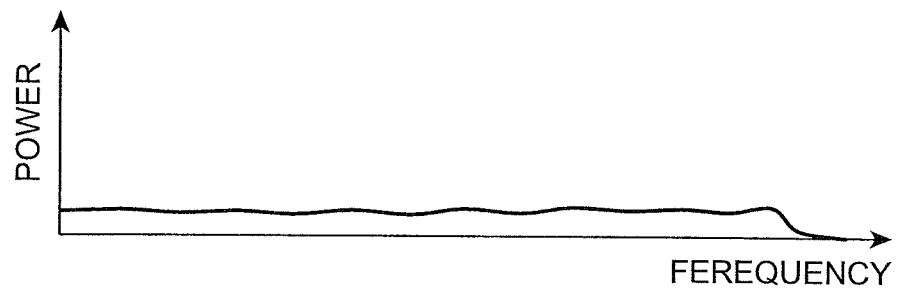

FIG. 4 is a chart illustrating respective spectra of interference signals caused by reflected light from positions z1, z2 in the optical line shown in FIG. 3(a). FIG. 4(a) illustrates a spectrum of interference signals caused by the reflected light from the position z1 exhibiting a high correlation shown in FIG. 3(a). FIG. 4(b) illustrates a spectrum of interference signals caused by the reflected light from the position z2 exhibiting a low correlation shown in FIG. 3(a).

As illustrated in FIG. 2(a), the direct modulation signal A is a periodical signal having the period p and used for optical frequency modulation of the output light from the light source 41. The period p defines the measurement position z in the optical line. When the delay time difference d of the reflected light (returning monitor light) generated by reflection/scattering at the position z of the optical line, which is an object to be measured, with respect to the reference light satisfies the condition of the following expression (2), the modulation phase of the reflected light from this position (position z1 in FIG. 3(a)) and that of the reference light are in synchronization with each other, whereby the correlation between the reflected light and reference light becomes higher. By contrast, the reflected light (returning monitor light) generated by reflection/scattering at a position (position z2 in FIG. 3(a)) failing to satisfy the condition of the following expression (2) exhibits a low correlation with the reference light.

$$d/p = \text{integer} \qquad (2)$$

When the correlation between the reflected light (returning monitor light) and reference light is strong (in the case of the position z1 in FIG. 3(a)), the spectrum of interference signals caused by these two kinds of light is localized in a frequency band which is on a par with the line width of the monitor light (see FIG. 4(a)). When the correlation is low (in the case of the position z2 in FIG. 3(a)), by contrast, the spectrum of interference signals is diffused over a frequency band on a par with the amplitude of optical frequency modulation of the monitor light (see FIG. 4(b)). Therefore, optical frequency modulation with an amplitude greater than the line width of the monitor light can selectively detect the reflected light from a specific measurement position. Since the spatial resolution is substantially in inverse proportion to the amplitude of optical frequency modulation, it will be more preferred if the amplitude of frequency modulation is greater. On the other hand, the current that can be injected into a laser diode acting as the light source 41 has an upper limit defined by a damage threshold and a lower limit of zero, thereby defining the upper limit of amplitude. The waveform of the direct modulation signal A is a sine wave in this embodiment, but may be various periodical waveforms such as those of rectangular and triangular waves.

More preferably, the spatial resolution is 9 cm or less. In this case, for preventing reflection peaks of optical filters belonging to different second optical lines from overlapping each other in this case, it is sufficient for the second optical lines to have respective lengths different from each other by at least 9 cm, whereby each second optical line is required to secure an extra length of only 9 cm. On the other hand, among single-mode optical fibers compliant with ITU-T G.652, those whose bending characteristic is enhanced so as to yield a permissible bending radius of 15 mm have been prevailing in general as optical fibers used as the second optical lines. Since one turn of such an optical fiber at a radius of 15 mm can accommodate an extra length of 9 cm, the spatial resolution of 9 cm or less can minimize the space for accommodating the extra length.

As illustrated in FIG. 2(b), the external modulation signal B is a periodical signal in synchronization with the direct modulation signal A and used for modulating the intensity of the output light from the light source 41 with the intensity modulator 42 in synchronization with the direct modulation signal A. This can shape the spectrum of the light issued from the intensity modulator 42. The reflected light detection sensitivity in the OCDR is expressed as a function of distance, which is known as an optical coherence function. For selectively detecting the reflected light from a specific measurement position, it will be preferred if the optical coherence function is closer to a delta function series. Since the optical coherence function is given by Fourier transform of a power spectrum of light, on the other hand, the position selectivity of reflected light measurement by the OCDR can be enhanced by shaping the spectrum by the intensity modulation.

As illustrated in FIG. 2(c), the monitor light gate signal C is a periodical signal having a pulse with the gate width w1 at the fixed period T and used for selecting the monitor light issued from the monitor light gate section 44 only in a period of the pulse having the gate width w1. As illustrated in FIG. 2(d), the electric signal gate signal D is a periodical signal having a pulse with the gate width w2 at the fixed period T and used for selecting the electric signal issued from the electric signal gate section 54 only in a period of the pulse having the gate width w2.

The period T of the electric signal gate signal D equals that of the monitor light gate signal C. The pulse center of the electric signal gate signal D is delayed by the delay time d than the pulse center of the monitor light gate signal C. This allows reflected light to be selectively detected from a specific measurement distance range (pulse window) in the optical line (see FIGS. 3(b) and (c)).

Preferably, the period p of the direct modulation signal A, the gate width w1 of the monitor light gate signal C, and the gate width w2 of the electric signal gate signal D satisfy the relationship of the following expression (3). In this case, the number of correlation peaks which may exist within the pulse window will be restricted to 1 if the gate delay time d is defined such that the correlation between the reflected light (returning monitor light) and reference light peaks at the center of the pulse window.

$$w1+w2<2p \qquad (3)$$

Preferably, each of the periods T of the monitor light gate signal C and electric signal gate signal D is an integral multiple of the period p of the direct modulation signal A. Preferably, the passband of the second filter 55 does not include frequencies at integral multiples of respective repetition frequencies f (=1/T) of the monitor light gate signal C and electric signal gate signal D.

This is because of the following reason. Letting E1 be the complex amplitude of the electric field of the reflected light (returning monitor light) fed into the balance detector 52 and E2 the complex amplitude of the electric field of the reference light fed into the balance detector 52, the electric signal (current I1) issued from the balance detector 52 is represented by the following expression (4) when proportionality coefficients are omitted. The first term of this expression defines non-interference noise. In the expression, $\epsilon$ indicates the attenuation coefficient of in-phase components by the balance detection. Though $\epsilon$ is ideally zero, it often takes a value of $10^{-5}$ or greater in practice, thereby causing noise. The second term defines an interference signal.

$$I1=\epsilon(|E1|^2+|E2|^2)+2Re[E1 \cdot E2^*] \qquad (4)$$

The non-interference noise is proportional to the optical intensity and has a DC component corresponding to an average power and a modulation component (period p) due to the parasitic intensity modulation and external intensity modulation in the light source 41. After the DC component of the non-interference noise is attenuated by the first filter 53, pulses are cut out therefrom by the electric signal gate signal D in the electric signal gate section 54.

The electric signal (current I2) issued from the electric signal gate section 54 is represented by the following expression (5). Here, F is the electric signal gate signal D and has the period T. The first and second terms of this expression define non-interference noise and an interference signal, respectively.

$$I2=\epsilon F(|E1|^2+|E2|^2)+2F \cdot Re[E1 \cdot E2^*] \qquad (5)$$

The non-interference noise in the first term of expression (5) is the product of a function of a frequency (1/p) and a function of a frequency (1/T), and thus becomes noise which occurs at a frequency (i/p+j/T), where i and j are integers. Here, when a pulse period is set such that each of the pulse repetition periods T of the monitor light gate signal C and electric signal gate signal D equals an integral multiple of the modulation period p of the direct modulation signal A, the frequency at which the non-interference noise occurs is restricted to i/T, where i is an integer. Therefore, measurement results with less noise can be obtained when a component of a frequency band not including the frequency (i/T) is cut out by the second filter 55 and employed as a detection band.

With reference to FIGS. 5 to 8, operations of the optical line monitoring apparatus 14A in accordance with the first embodiment will be explained together with a method of shortening the time required for measuring a reflectance distribution along the optical line with a high resolution by the OTDR measurement and a plurality of OCDR measurements.

Figure 5:
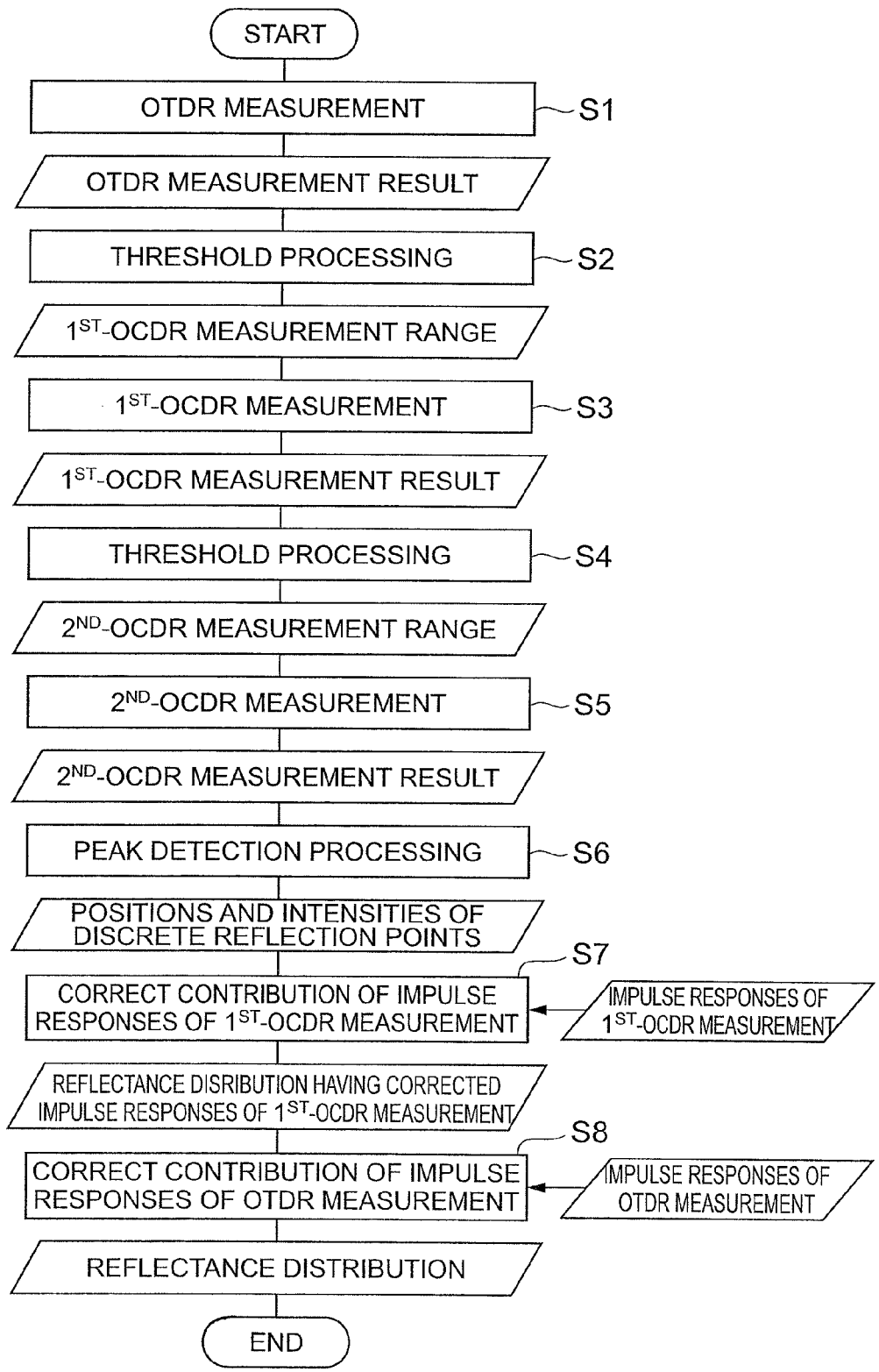
[FIG. 5] is a flowchart for explaining operations of the optical line monitoring apparatus 14A in accordance with the first embodiment.
Figure 6:
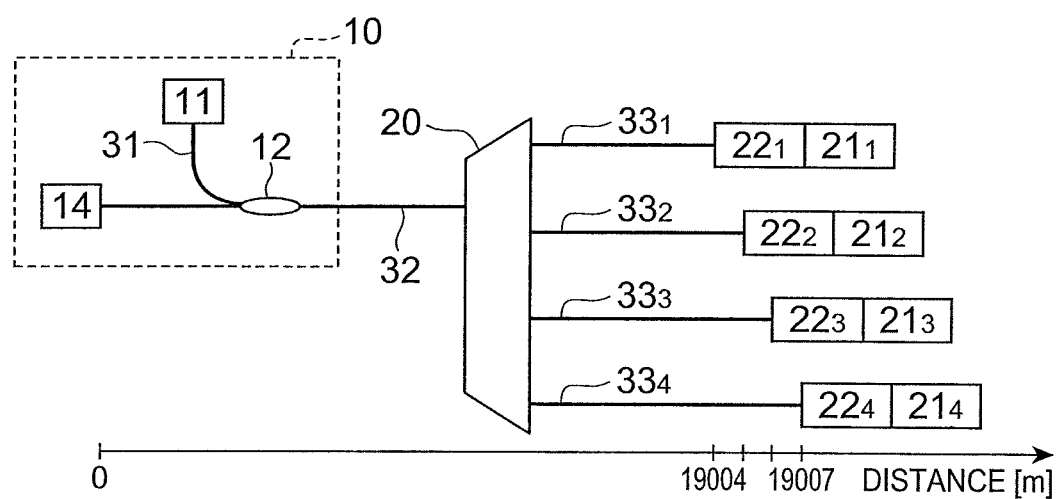
[FIG. 6] is a view schematically illustrating the structure of the optical line monitoring system 1A in accordance with the first embodiment.
Figure 7:
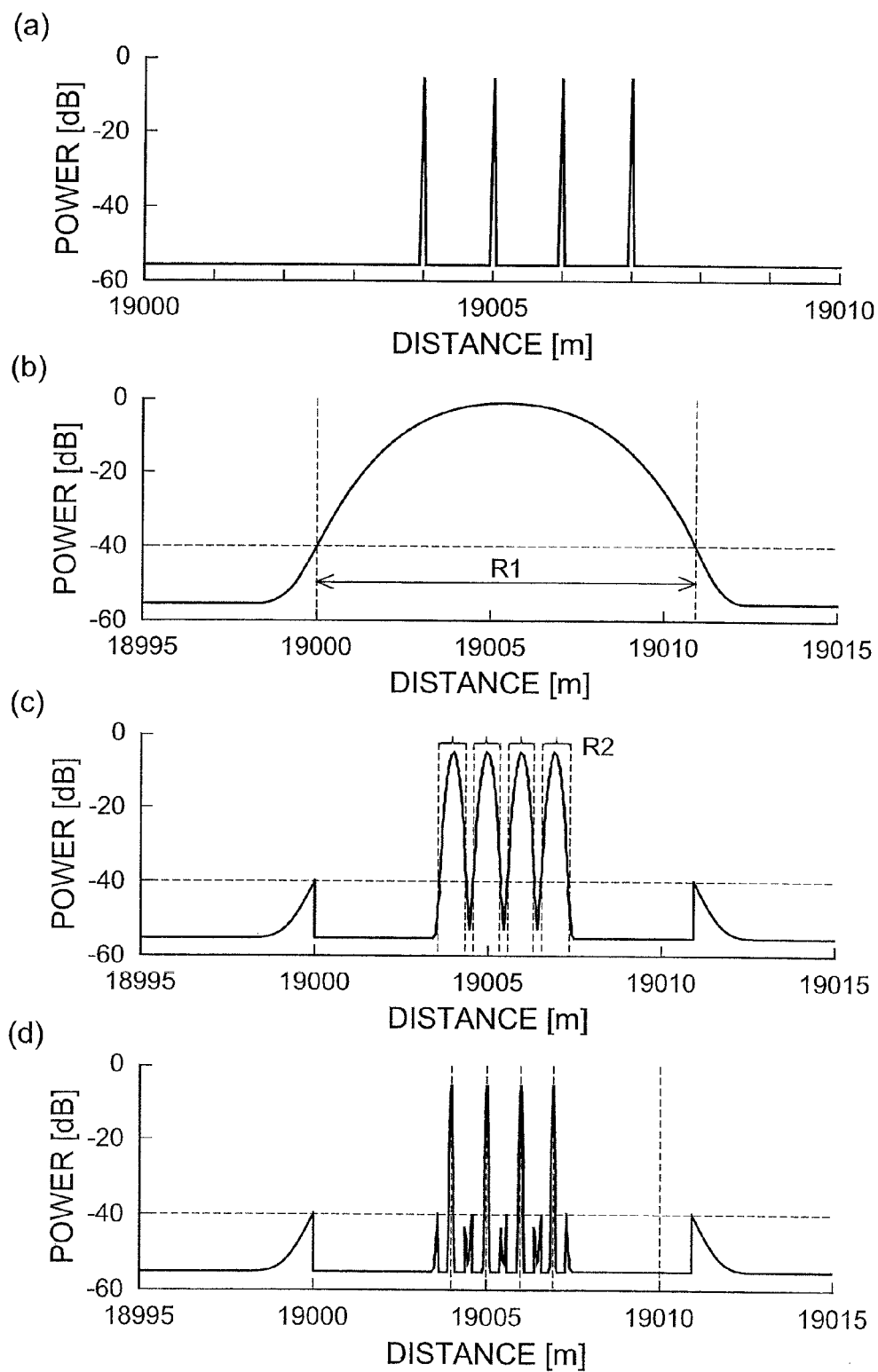
[FIG. 7] is a chart illustrating results of calculation of measured waveforms when a reflectance distribution is measured in the optical line monitoring system 1A in accordance with the first embodiment.
Figure 8:
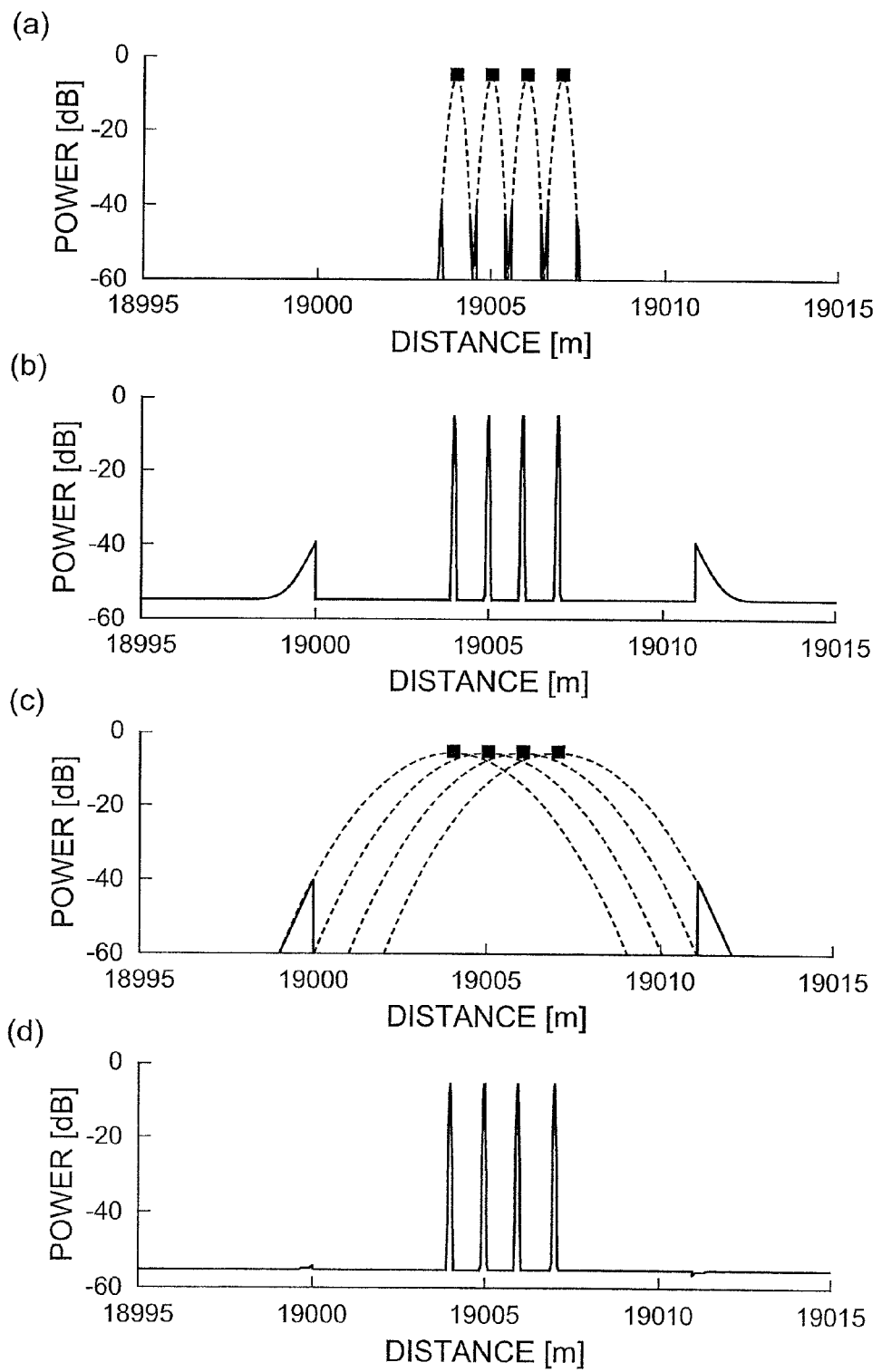
[FIG. 8] is a chart illustrating results of calculation of measured waveforms when a reflectance distribution is measured in the optical line monitoring system 1A in accordance with the first embodiment.

FIG. 5 is a flowchart for explaining operations of the optical line monitoring apparatus 14A in accordance with the first embodiment. FIG. 6 is a view schematically illustrating the structure of the optical line monitoring system 1A in accordance with the first embodiment. FIGS. 7 and 8 are charts illustrating results of calculation of measured waveforms when a reflectance distribution is measured in the optical line monitoring system 1A in accordance with the first embodiment Here, as illustrated in FIG. 6, let N be 4, so that the optical line monitoring system 1A includes four subscriber terminals $21_1$ to $21_4$, and optical filters $22_1$ to $22_4$ are inserted at the ends of the subscriber terminals connected to their corresponding optical lines. Let the respective distances from the optical line monitoring apparatus 14A to the optical filters $22_1$, $22_2$, $22_3$, $22_4$ be 19004 m, 19005 m, 19006 m, and 19007 m. Let the reflectance of each optical filter $22_n$ be −5 dB. The reflectance distribution at this time, which is illustrated in FIG. 7(a), is measured by the optical line monitoring apparatus 14A according to the following procedure.

First, the measurement by OTDR is carried out (step S1). In the OTDR measurement, pulsed monitor light is emitted from the light source 71 of the OTDR measurement section 16, the reflected light occurring when the monitor light propagates through the optical line is received by the photodetector 73 of the OTDR measurement section 16, and the intensity of the reflected light is measured as a function of time. The A/D converter 74 converts the result of OTDR measurement into digital data, which is acquired by the control section 75 and further by the control section 17.

Since the length of a typical optical line is about 20 km or less, while the velocity of light in the optical line is about $2\times10^8$ m/s, the time required for the monitor light to return by reflection is 100 μs or less. Therefore, the OTDR measurement can be carried out in a short time. On the other hand, because of a decrease in SNR occurring when reducing the pulse width and the like, the lower limit of the spatial resolution of OTDR is about 2 m in practice. In this case, as illustrated in FIG. 7(b), the OTDR measurement cannot discretely identify four optical filters arranged at intervals of 1 m, but as one broad reflection peak.

Subsequently, the OTDR measurement result is subjected to threshold processing (step S2). The threshold processing extracts a distance range R1 where the reflected light power is not less than a threshold. The threshold is set between the power at the reflection peak and the reflected light power caused by Rayleigh scattering. In FIG. 7(b), the measurement range R1 is a range of 11 m from 19000 m to 19011 m.

Next, using the distance range R1 as a measurement range, the first OCDR measurement is carried out (step S3). The spatial resolution is set to 20 cm in the first OCDR measurement. FIG. 7(c) illustrates a measurement result obtained by combining the result of the first OCDR measurement in the measurement range R1 and the result of the OTDR measurement in the range other than the measurement range R1. The first OCDR measurement discretely identifies the four optical filters arranged at intervals of 1 m as four reflection peaks.

Subsequently, the first OCDR measurement result is subjected to threshold processing (step S4). The threshold processing extracts a distance range R2 where the reflected light power is not less than a threshold. In FIG. 7(c), the measurement range R2 includes four partial ranges of 19003.60 to 19004.42 m, 19004.60 to 19005.42 m, 19005.60 to 19006.42 m, and 19006.60 to 19007.42 m, thus yielding a range of 328 cm (=82 cm×4) in total.

Next, using the distance range R2 as a measurement range, the second OCDR measurement is carried out (step S5). The spatial resolution is set to 4 cm in the second OCDR measurement. FIG. 7(d) illustrates a measurement result obtained by combining the result of the second OCDR measurement in the measurement range R2 and the result of the first OCDR measurement (including the result of the OTDR measurement) in the range other than the measurement range R2. The second OCDR measurement further narrows the width of reflection peaks of the four optical filters, thereby making it possible to determine peak positions with a higher precision.

Subsequently, the second OCDR measurement result is subjected to peak detection processing (step S6). The peak detection processing identifies the positions of the four optical filters, thereby yielding data concerning positions and intensities (peak values of reflected light power) of the discrete reflection points. FIG. 8(a) plots this data.

Next, the data concerning the positions and intensities of the discrete reflection points stored in the storage device 18 and impulse responses of the first OCDR measurement are subjected to a convulsion operation, so as to determine the contribution of the impulse responses of the first OCDR measurement to the measurement result (step S7). Each impulse response is a measurement result obtained when only one reflection point exists. Four impulse responses respectively convolved with the four discrete reflection points are illustrated by dotted lines in FIG. 8(a).

Adding these impulse responses in the ranges other than the measurement range R2 determines the contribution of the impulse responses to the first OCDR measurement. This is illustrated by solid lines in FIG. 8(a). Subtracting the contribution of the impulse responses from the result of the second OCDR measurement (FIG. 7(d)) yields a reflectance distribution in which the impulse responses of the first OCDR measurement are corrected. FIG. 8(b) illustrates the reflectance distribution after the correction.

Similarly, the data concerning the positions and intensities of the discrete reflection points stored in the storage device 18 and impulse responses of the OTDR measurement are subjected to a convulsion operation, so as to determine the contribution of the impulse responses of the OTDR measurement to the measurement result (step S8). Four impulse responses respectively convolved with the four discrete reflection points are illustrated by dotted lines in FIG. 8(c).

Adding these impulse responses in the ranges other than the measurement range R2 determines the contribution of the impulse responses to the first OCDR measurement. This is illustrated by solid lines in FIG. 8(c). Subtracting the contribution of the impulse responses from the reflectance distribution (FIG. 8(b)) in which the impulse responses of the first OCDR measurement are corrected yields a reflectance distribution in which the impulse responses of the OTDR measurement are corrected. FIG. 8(d) illustrates the reflectance distribution after the correction. As illustrated in FIG. 8(d), a measurement result favorably matching the reflectance distribution to be measured (FIG. 7(a)) is obtained.

As in the foregoing, when no processing for correcting impulse responses is carried out, the impulse responses cause discontinuities of measurement results at boundary portions in the measurement range as illustrated in FIG. 7(d). By contrast, performing the processing for correcting the impulse responses yields measurement results which have reduced the discontinuities as illustrated in FIG. 8(d). Since the discontinuities are often hard to distinguish from the contribution of characteristic points, such as reflection and optical loss in the optical line, to the measurement results, decreasing the discontinuities can reduce misdetections of characteristic points.

For achieving the processing for correcting the impulse responses, it will be desirable if the respective impulse responses of the OCDR and OTDR measurements are stored in the storage device 18. The impulse responses may also be determined by intentionally providing a reflection point within the optical line monitoring apparatus or optical line and measuring this reflection point.

As mentioned above, the combination of the OTDR measurement (with a resolution of 2 m), the first OCDR measurement (with a resolution of 20 cm), and the second OCDR measurement (with a resolution of 4 cm) can detect discrete reflection points over a wide distance range with a high spatial resolution in a short time. If a distance range of about 20 km is measured without omission by OCDR with a resolution of 4 cm as mentioned above, the number of OCDR measurement points will be half a million. Since the OCDR measurement typically takes about 1 ms/point, 500 seconds are necessary as the measurement time. In this embodiment, by contrast, the measurement time for the OTDR is 100 μs, the measurement time for the first OCDR measurement (in which the length of the measurement range R1 is 11 m, while the resolution is 20 cm) is 55 ms (=55 points×1 ms/point), and the measurement time for the second OCDR measurement (in which the total length of the measurement range R2 is 328 cm, while the resolution is 4 cm) is 82 ms (=82 points×1 ms/point), whereby the measurement time is reduced to 137 ms.

Second Embodiment

Figure 9:
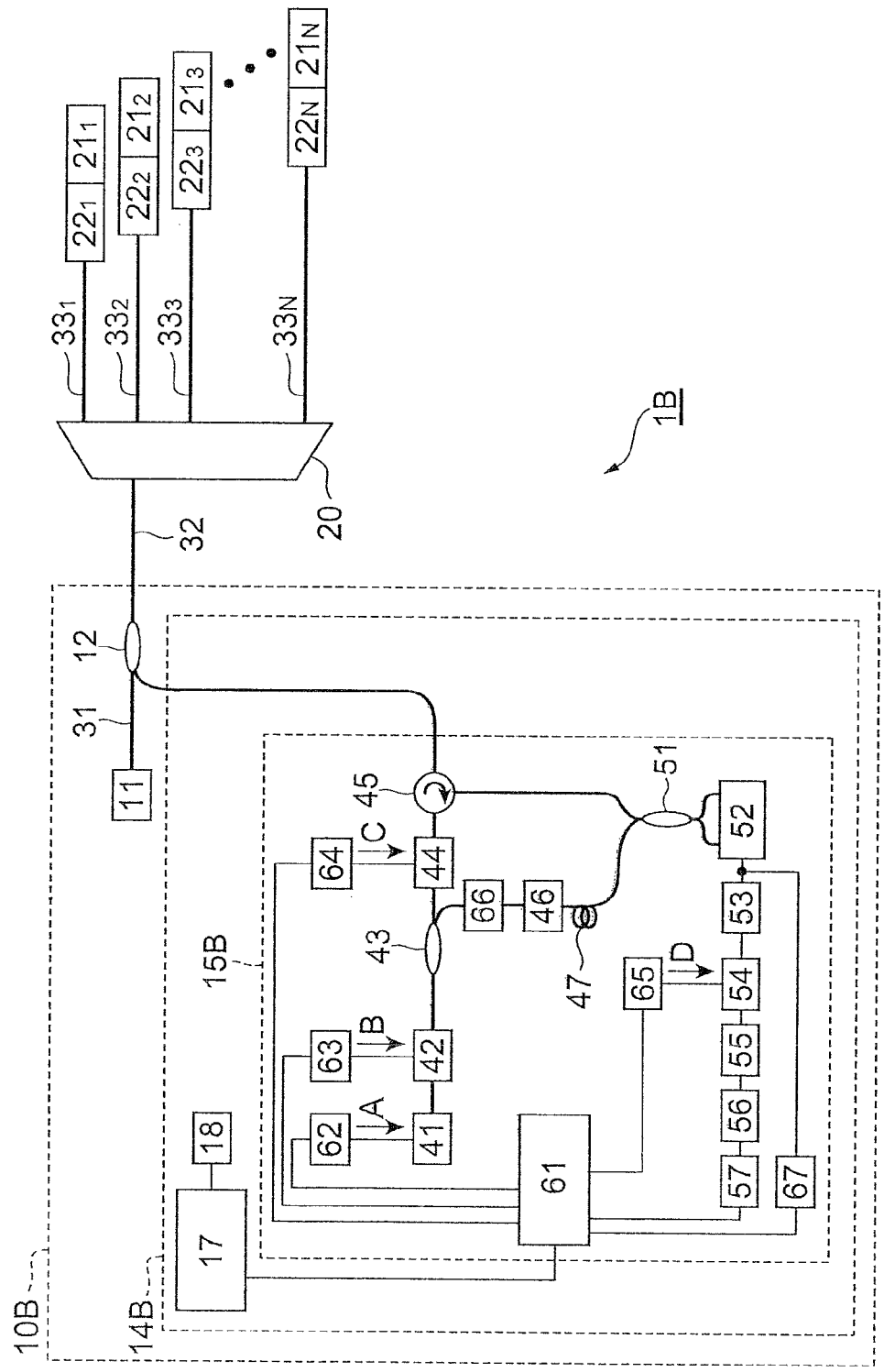
[FIG. 9] is a view illustrating an optical line monitoring system 1B equipped with an optical line monitoring apparatus 14B in accordance with a second embodiment.

FIG. 9 is a view illustrating the structure of an optical line monitoring system 1B equipped with an optical line monitoring apparatus 14B in accordance with the second embodiment. The optical line monitoring system 1B in accordance with the second embodiment illustrated in FIG. 9 differs from the optical line monitoring system 1A in accordance with the first embodiment illustrated in FIG. 1 in that it comprises a station 10B instead of the station 10A and in that the station comprises the optical line monitoring apparatus 14B instead of the optical line monitoring apparatus 14A.

The optical line monitoring apparatus 14B in FIG. 9 also differs from the optical line monitoring apparatus 14A in FIG. 1 in that it comprises an OCDR/OTDR measurement section 15B instead of the OCDR measurement section 15 and OTDR measurement section 16. The OCDR/OTDR measurement section 15B in FIG. 9 differs from the OCDR measurement section 15 in FIG. 1 in that it comprises an optical switch 66 and an A/D converter 67.

The optical switch 66 is provided between the optical splitter 43 and the polarization modulator 46 and passes/blocks light issued as a branch from the optical splitter 43. The A/D converter 67 converts the electric signal (analog signal) issued from the balance detector 52 into a digital signal and outputs the digital signal to the control section 61.

The OCDR/OTDR measurement section 15B can carry out both of OCDR and OTDR measurements. When the OCDR/OTDR measurement section 15B carries out the OCDR measurement, the optical switch 66 is turned on. The other constituents of the OCDR/OTDR measurement section 15B operate as in the OCDR measurement section 15 in FIG. 1, thereby achieving the OCDR measurement.

When the OCDR/OTDR measurement section 15B carries out the OTDR measurement, the switch 66 is turned off, whereby the light issued from the optical splitter 43 after being split is not fed into the balance detector 52. The signal generator 62 outputs a pulse signal, while the light source 41 having received the pulse signal outputs pulsed monitor light. The optical intensity modulator 42 and monitor light gate section 44 are in their passable states, so that the pulsed monitor light emitted from the light source 41 passes the optical intensity modulator 42 and monitor light gate section 44 as it is.

Alternatively, pulsed monitor light may be generated by outputting continuous light from the light source 41 and modulating its optical intensity with the optical intensity modulator 42 or monitor light gate section 44. In this case, diffusing the optical spectrum by frequency modulation in the light source 41 can inhibit stimulated Brillouin scattering from occurring in the optical line, whereby monitor light having a higher power can be sent to the optical line. This improves the SNR of measurement and elongates the measurement distance, whereby the permissible optical line loss can be extended.

Through the optical circulator 45 and optical coupler 12, the monitor light is sent to the PON system (first optical line 32, optical splitter 20, second optical line $33_n$, and optical filter $22_n$) that is an object to be measured, while the reflected light generated within the object travels the optical coupler 12 and optical circulator 45, so as to reach the balance detector 52. In the case of OTDR measurement, the balance detector 52 operates in an imbalanced manner, so as to output an electric signal proportional to the reflected light power. The electric signal issued from the balance detector 52 is split into two, one of which is fed to the A/D converter 57 through the first filter 53 and the like, while the other is fed to the A/D converter 67. The output from the A/D converter 67 is read by the control section 61 and stored as an OTDR measurement result.

The OCDR and OTDR measurement results acquired by the OCDR/OTDR measurement section 15B as in the foregoing are processed by the control section 17 as in the first embodiment.

Thus, the OTDR and OCDR measurements share the light source section and detection section in this embodiment. This can reduce mismatches between the OTDR and OCDR measurement results caused by fluctuations in light source wavelengths and fluctuations in sensitivities of detection sections as compared with cases without sharing. Such mismatches cannot be eliminated by the impulse response correction processing explained in the first embodiment and may cause discontinuities of measurement results. By contrast, sharing the light source section and detection section as in this embodiment can decrease such discontinuities, thereby reducing misdetections of characteristic points in the optical line.

Third Embodiment

Figure 10:
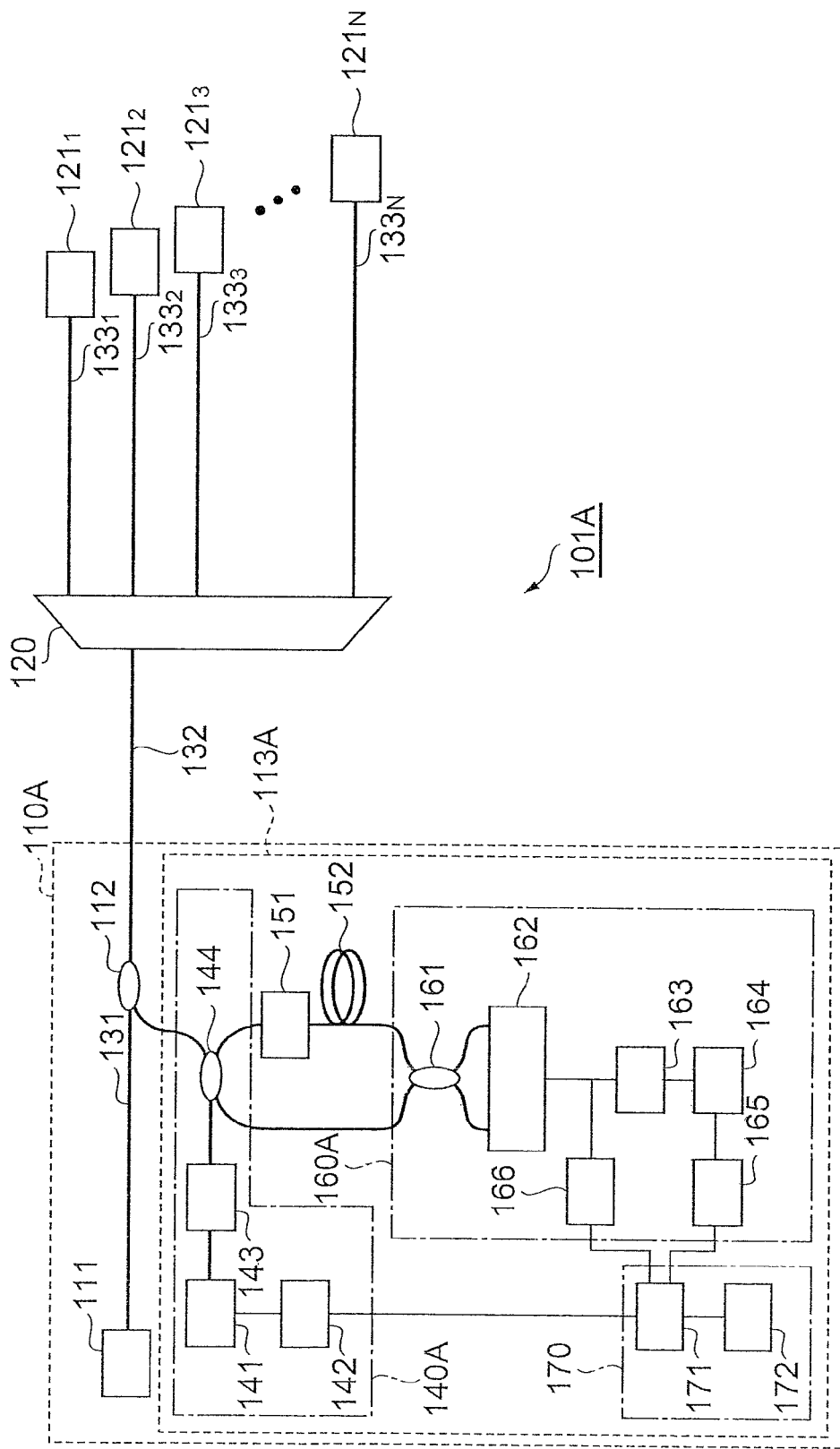
[FIG. 10] is a structural diagram of an optical communication system 101A and optical reflection measurement apparatus 113A in accordance with a third embodiment.

FIG. 10 is a structural diagram of an optical communication system 101A and optical reflection measurement apparatus 113A in accordance with the third embodiment. The optical communication system 101A illustrated in this drawing is one in which a station-side terminal 111 provided in a station 110A is optically connected to N subscriber terminals $121_1$ to $121_N$ with optical fiber lines through an optical splitter 120, so as to carry out optical communications between the station-side terminal 111 and each subscriber terminal $121_n$. Here, N is an integer of 2 or more, while n is an integer of at least 1 but no more than N. Such a mode of the optical communication system 101A is known as PON (Passive Optical Network). The number of branches N is typically 4 to 32.

The station 110A is provided with an optical coupler 112 and an optical reflection measurement apparatus 113A in addition to the station-side terminal 111. The station-side terminal 111 and the optical coupler 112 are optically connected to each other with an optical fiber line 131. The optical coupler 112 and the optical splitter 120 are optically connected to each other with an optical fiber line 132. The optical splitter 120 and each subscriber terminal $121_n$ are optically connected to each other with an optical fiber line $133_n$. The optical reflection measurement apparatus 113A is also optically connected to the optical coupler 112.

The optical reflection measurement apparatus 113A can carry out both OCDR and OTDR measurements and outputs results of the OCDR and OTDR measurements in combination with each other. The optical reflection measurement apparatus 113A comprises not only a light source section 140A, a measurement section 160A, and a processing section 170, but also an optical modulator 151 and an optical delay line 152.

To the optical coupler 112, the light source section 140A selectively outputs one of first monitor light in which an optical frequency is modulated such as to yield a comb-teeth-shaped optical coherence function and pulsed second monitor light. The light source section 140A also outputs a branch of the first monitor light as reference light to the optical modulator 151. The first monitor light and reference light are used for the OCDR measurement, while the second monitor light is used for the OTDR measurement. The light source section 140A includes a light source 141, a signal generator 142, an optical modulator 143, and an optical coupler 144.

The light source 141 included in the light source section 140A is one which can modulate an optical frequency of output light; its examples include semiconductor DFB laser light sources and semiconductor laser light sources equipped with external resonators. The light source 141 outputs continuous light. The signal generator 142 outputs a modulation signal for modulating the optical frequency of the continuous light emitted from the light source 141 and supplies this modulation signal to the light source 141. The optical modulator 143 inputs therein the light emitted from the light source 141 and outputs it after modulating the same as necessary. The optical coupler 144 splits the light issued from the optical modulator 143 into two, outputs one of them to the optical coupler 112 and the other to the optical modulator 151.

The measurement section 160A acquires an OCDR measurement result according to the reflected light occurring when the first monitor light emitted from the light source section 140A propagates through the object to be measured and the reference light emitted from the light source section 140A. The measurement section 160A also acquires an OTDR measurement result according to the reflected light occurring when the second monitor light emitted from the light source section 140A propagates through the object to be measured. The measurement section 160A includes an optical coupler 161, a balance detector 162, a filter 163, an RF detector 164, an AID converter 165, and an A/D converter 166.

The optical coupler 161 included in the measurement section 160A inputs therein the light issued from the optical coupler 144 and the light exiting the optical delay line 152 if any, and outputs them to the balance detector 162. The balance detector 162 inputs and detects the light issued from the optical coupler 161 and outputs an electric signal indicating the result of detection to the filter 163 or A/D converter 166. The filter 163 inputs the electric signal issued from the balance detector 162, removes unnecessary noise included in the electric signal, and outputs the remaining electric signal to the RF detector 164.

The RF detector 164 included in the measurement section 160A inputs therein the electric signal issued from the filter 163, converts it into an electric signal corresponding to the magnitude of the interference component, and outputs the resulting signal to the A/D converter 165. The A/D converter 165 inputs therein the electric signal issued from the RF detector 164, converts this electric signal (analog signal) to a digital signal, and outputs the digital signal (OCDR measurement result) to the processing section 170. The A/D converter 166 inputs therein the electric signal issued from the balance detector 162, converts this electric signal (analog signal) to a digital signal, and outputs the digital signal (OTDR measurement result) to the processing section 170.

The A/D converter 166 is not used for the OCDR measurement. The filter 163, RF detector 164, and A/D converter 165 are not used for the OTDR measurement.

The processing section 170 outputs the OCDR and OTDR measurement results acquired by the measurement section 160A in combination with each other. The processing section 170 also performs a predetermined arithmetic operation according to the OCDR and OTDR measurement results and outputs the result of the arithmetic operation. The processing section 170 includes a control section 171 and a storage section 172.

The control section 171 included in the processing section 170 controls operations of the light source section 140A. The control section 171 inputs therein the digital signal (OCDR measurement result) issued from the A/D converter 165 and the digital signal (OTDR measurement result) issued from the A/D converter 166 and causes the storage section 172 to store the OCDR and OTDR measurement results. The storage section 172 stores the pulse time waveform of the second monitor light beforehand. The control section 171 performs a predetermined arithmetic operation according to the OCDR measurement result, the OTDR measurement result, and the pulse time waveform of the second monitor light and outputs the result of the arithmetic operation.

The OCDR measurement will now be explained. In the case of OCDR measurement, the light source section 140A outputs the first monitor light whose optical frequency is modulated such as to yield a comb-teeth-shaped optical coherence function. Here, the continuous light emitted from the light source 141 is one whose optical frequency is modulated by the signal generator 142 such as to yield a comb-teeth-shaped optical coherence function. In a specific example, light whose optical frequency is modulated at fixed time period into $f_0$, $f_0+f_s$, $f_0-f_s$, $f_0+2f_s$, $f_0-2f_s$, $f_0+3f_s$, . . . in this order is employed as the first monitor light. In another example, light whose optical frequency is modulated into a sine wave at a modulation frequency of $f_s$ is used as the first monitor light. The optical coherence function of the first monitor light whose optical frequency is thus modulated has a peak (coherence peak) shaped similar to a delta function when $f_s\tau$ is an integer. Hence, these kinds of first monitor light have a comb-teeth-shaped coherence function. The position of the coherence peak varies as $f_s$ changes.

Preferably, the optical modulator 143 subjects the continuous light emitted from the light source 141 to intensity modulation in synchronization with optical frequency modulation and outputs thus intensity-modulated light as the first monitor light. Such first monitor light becomes one in which side lobes of the optical coherence function are suppressed. The optical coupler 144 outputs the first monitor light issued from the optical modulator 143 to the optical coupler 112, and a branch of the first monitor light as the reference light to the optical modulator 151.

The first monitor light fed from the optical coupler 144 to the optical coupler 112 propagates through the optical fiber line 132, optical splitter 120, and optical fiber line $133_n$ to the subscriber terminal $121_n$. As the first monitor light propagates through the object to be measured (optical fiber line 132, optical splitter 120, optical fiber line $133_n$, and subscriber terminal $121_n$), Fresnel reflected light occurs at discrete reflection points on the object, while Rayleigh scattering light occurs in segments between the discrete reflection points. These kinds of reflected light (Fresnel reflected light and Rayleigh scattering light) are fed into the optical coupler 161 through the optical couplers 112, 144.

On the other hand, the reference light issued from the optical coupler 144 to the optical modulator 151 is fed into the optical coupler 161 through the optical modulator 151 and optical delay line 152. The optical modulator 151 inputs therein the reference light issued from the optical coupler 144 and gates the reference light at predetermined timings if necessary, so as to determine a measurement position in the object to be measured in the OCDR measurement. By imparting a delay to the reference light issued from the optical modulator 151, the optical delay line 152 decreases the optical path length difference between the reflected light of the first monitor light and reference light fed into the optical coupler 161, thereby reducing the noise caused by phase fluctuations of the light emitted from the light source 141.

The optical modulator 151 may gate the reference light, polarization-modulate the reference light, shift the optical frequency of the reference light, or carry out a plurality of these operations. Polarization-modulating the reference light and averaging the OCDR measurement results in a plurality of polarization states can reduce the influence of polarization fluctuations in the first monitor light and reference light. Shifting the optical frequency of the reference light such as to allow heterodyne detection of the reflected light of the first monitor light can reduce the noise caused by intensity fluctuations of the first monitor light.

The optical coupler 161 combines the reflected light of the first monitor light issued from the optical coupler 144 and the reference light exiting the optical delay line 152 and outputs thus combined light to the balance detector 162. The balance detector 162 inputs therein the reflected light and reference light, performs their balance detection, and outputs an electric signal corresponding to the interference component of respective electric fields of the reflected light and reference light to the filter 163. The filter 163 inputs therein the electric signal issued from the balance detector 162, removes unnecessary noise included in the electric signal, and outputs the remaining electric signal to the RF detector 164.

The RF detector 164 inputs therein the electric signal issued from the filter 163, converts it into an electric signal corresponding to the magnitude of the interference component, and outputs the resulting signal to the A/D converter 165. The A/D converter 165 inputs therein the electric signal issued from the RF detector 164, converts this electric signal to a digital signal, and outputs the digital signal to the control section 171. The control section 171 inputs therein the digital signal issued from the A/D converter 165 and causes the storage section 172 to store the digital signal. The value of the digital signal indicates the reflectance at the measurement position in the object to be measured.

Further, the parameter $f_s$ for the optical frequency modulation in the light source 141 is changed under the control of the control section 171, so as to alter the coherence peak position (i.e., the measurement position in the object to be measured), and the digital signal indicating the reflectance at the measurement position in the object to be measured is stored by the storage section 172 as mentioned above. Scanning the coherence peak position (i.e., the measurement position in the object to be measured) yields the OCDR measurement result.

The OTDR measurement will now be explained. In the case of OTDR measurement, the light source section 140A outputs the second monitor light in a pulse form. Here, the optical modulator 143 modulates the intensity of the continuous light emitted from the light source 141 and outputs the resulting light as the pulsed second monitor light. Here, it will be preferred if the light source 141 modulates the optical frequency according to the modulation signal issued from the signal generator 142, so as to output continuous light whose spectrum is diffused. Thus diffusing the spectrum of the second monitor light can inhibit a nonlinear optical phenomenon such as stimulated Brillouin scattering from occurring when the second monitor light propagates through the optical fiber lines 132, $133_1$ to $133_N$. The optical coupler 144 outputs the second monitor light issued from the optical modulator 143 to the optical coupler 112, and a branch of the second monitor light to the optical modulator 151. The light fed to the optical modulator 151 is blocked thereby.

The second monitor light fed from the optical coupler 144 to the optical coupler 112 propagates through the optical fiber line 132, optical splitter 120, and optical fiber line $133_n$ to the subscriber terminal $121_n$. As the second monitor light propagates through the object to be measured (optical fiber line 132, optical splitter 120, optical fiber line $133_n$, and subscriber terminal $121_n$), Fresnel reflected light occurs at discrete reflection points on the object, while Rayleigh scattering light occurs in segments between the discrete reflection points. These kinds of reflected light (Fresnel reflected light and Rayleigh scattering light) are fed into the optical coupler 161 through the optical couplers 112, 144.

The optical coupler 161 inputs therein the reflected light of the second monitor light issued from the optical coupler 144 and outputs it to the balance detector 162. The balance detector 162 operates in an imbalanced manner, so as to input the light issued from the optical coupler 161 and output an electric signal corresponding to the power of the input light to the A/D converter 166. A time function of this electric signal represents a reflectance distribution in the object to be measured. The A/D converter 166 inputs therein the electric signal issued from the balance detector 162, converts the electric signal into digital signals at fixed period, and outputs the digital signals to the control section 171. The control section 171 inputs therein the digital signals issued from the A/D converter 166 and causes the storage section 172 to store them. Thus, the OTDR measurement result is obtained.

Figure 11:
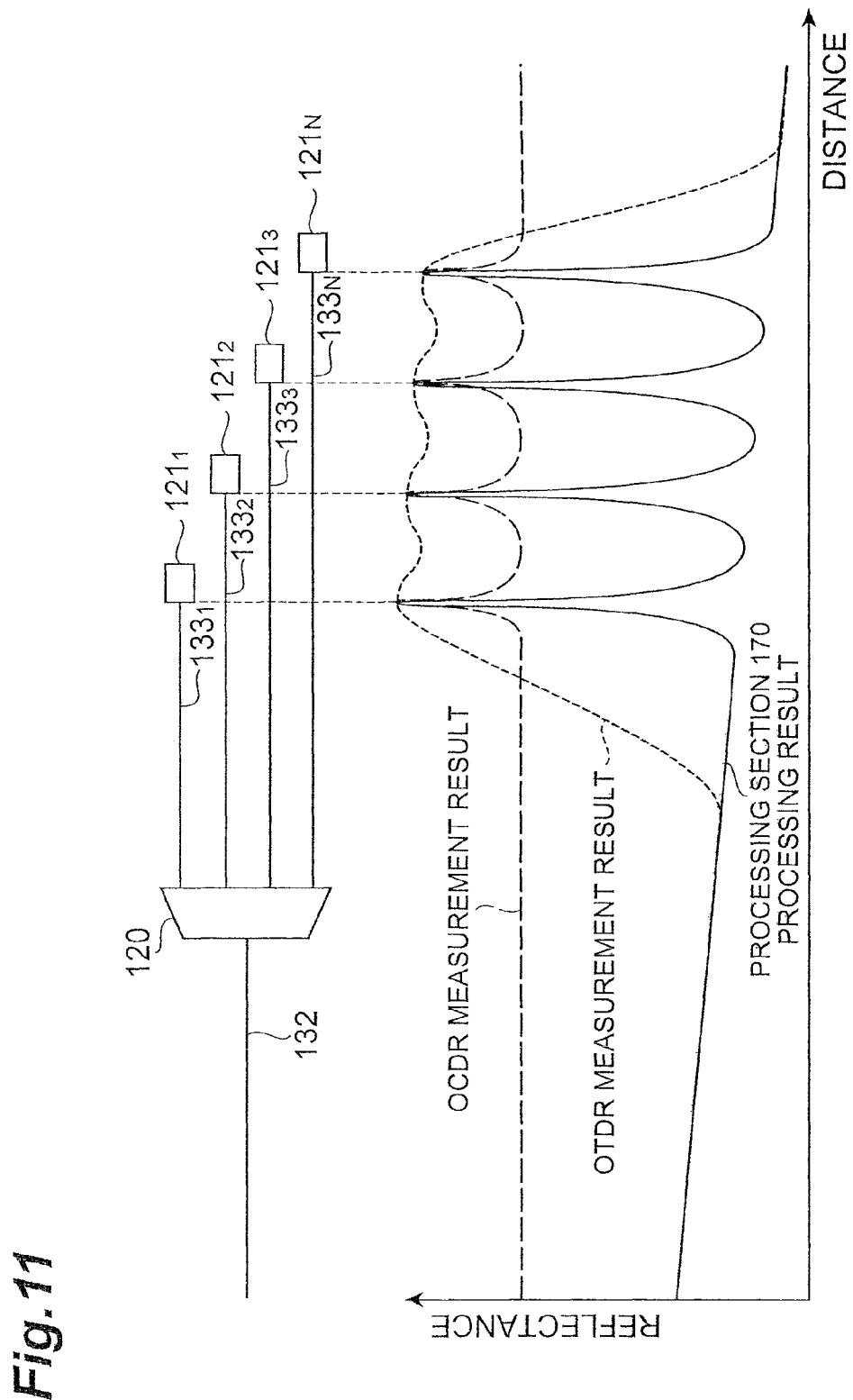
[FIG. 11] is a chart schematically illustrating respective results of OCDR measurement, OTDR measurement, and processing by a processing section 170.
Figure 12:
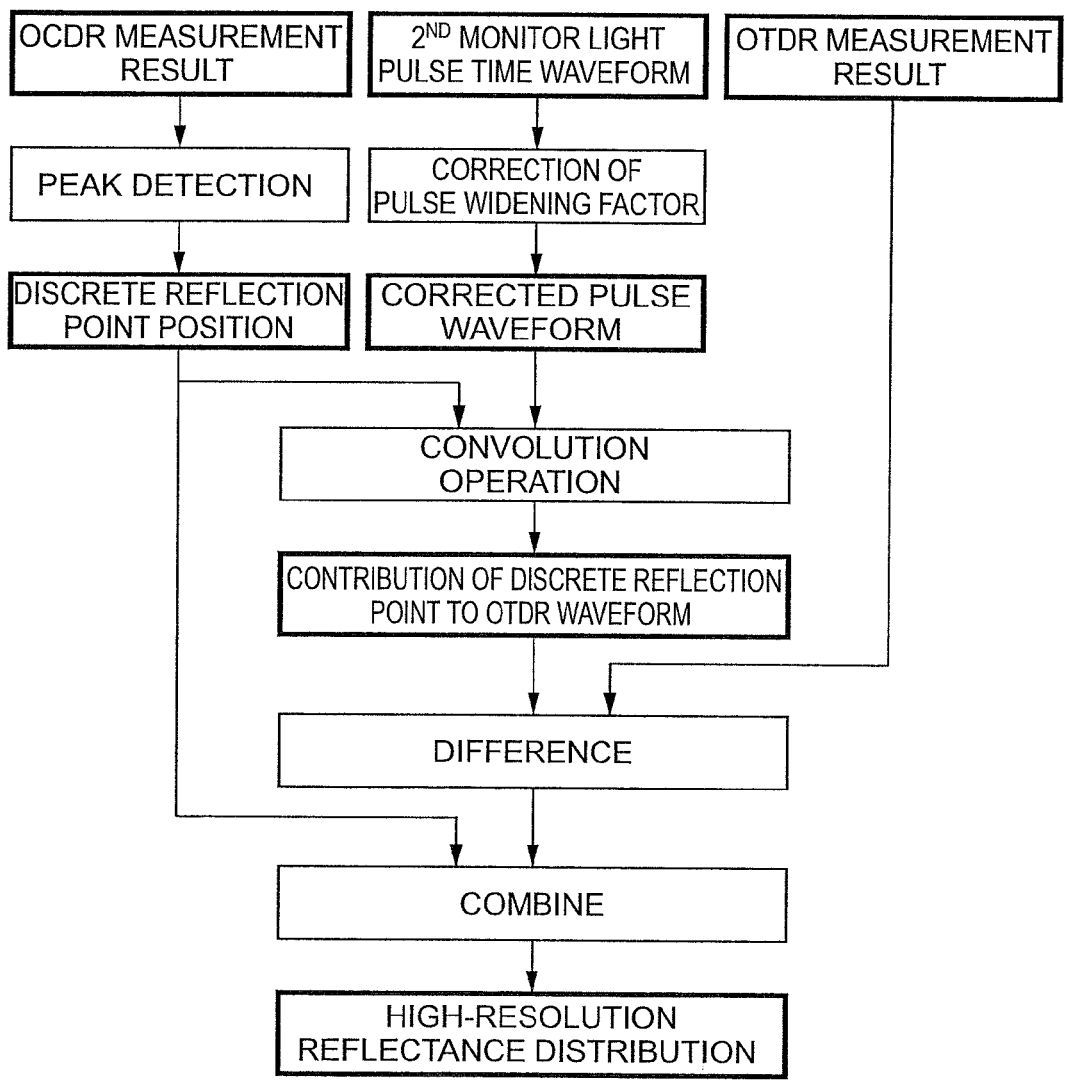
[FIG. 12] is a chart illustrating a flow of processing by the processing section 170.

Details of the processing in the processing section 170 will now be explained with reference to FIGS. 11 and 12. FIG. 11 is a chart schematically illustrating respective results of OCDR measurement, OTDR measurement, and processing by the processing section 170. FIG. 12 is a chart illustrating a flow of processing by the processing section 170. The control section 171 included in the processing section 170 carries out the following processing by using the OCDR and OTDR measurement results obtained as in the foregoing and stored in the storage section 172 and the pulse time waveform of the second monitor light stored beforehand in the storage section 172.

In general, as illustrated in FIG. 11, the OCDR measurement result yields positions of discrete reflection points (e.g., the connection point between the optical fiber lines $133_n$ and the subscriber terminal $121_n$) with a high resolution, but fails to yield information in segments between the reflection points since coherent noise due to side lobes of the optical coherence function is observed in these segments. In the OTDR measurement result, on the other hand, Rayleigh scattering light is observed in the segments between the discrete reflection points, while broad peaks due to convolutions of the reflection point positions with the pulse time waveform of the second monitor light are observed near the reflection points.

Therefore, taking account of such respective characteristics of the OCDR and OTDR measurement results, the processing section 170 of the optical reflection measuring apparatus 113A in accordance with this embodiment carries out the processing illustrated in FIG. 12 by using the OCDR and OTDR measurement result and the pulse time waveform of the second monitor light, thereby yielding a high-resolution reflection point measurement result including the Rayleigh scattering light measurement as illustrated in FIG. 11.

By using the OCDR measurement result stored in the storage section 172, the control section 171 included in the processing section 170 initially carries out threshold processing of the OCDR measurement result at a predetermined level higher than the coherence noise, so as to detect peak positions, thereby determining a list of positions of the discrete reflection points in the object to be measured.

By using the pulse time waveform of the second monitor light stored in the storage section 172 and information such as the longitudinal distribution of wavelength dispersion or polarization mode dispersion of the object to be measured, the control section 171 determines the pulse time waveform of the second monitor light at each position due to the pulse expansion when the second monitor light propagates through the object.

The control section 171 subjects the already determined discrete reflection point position list and pulse time waveform of the second monitor light at each position to a convulsion operation, so as to determine how much the reflection of the second monitor light at the discrete reflection points contributes to the OTDR measurement result.

The control section 171 corrects the OTDR measurement result stored in the storage section 172 according to thus determined degree of contribution and outputs the result of correction. Specifically, the control section 171 subtracts the contribution of the reflection of the second monitor light at the discrete reflection points from the OTDR measurement result, generates a reflection peak waveform shaped like a delta function from the discrete reflection point position list, and combines this waveform with the result of subtraction.

Since the processing section 170 carries out such processing, the optical reflection measurement apparatus 113A in accordance with this embodiment can highly accurately detect the Rayleigh scattering light and discrete reflected light occurring in the object to be measured, thereby yielding a high-resolution measurement result of the reflectance distribution.

Fourth Embodiment

Figure 13:
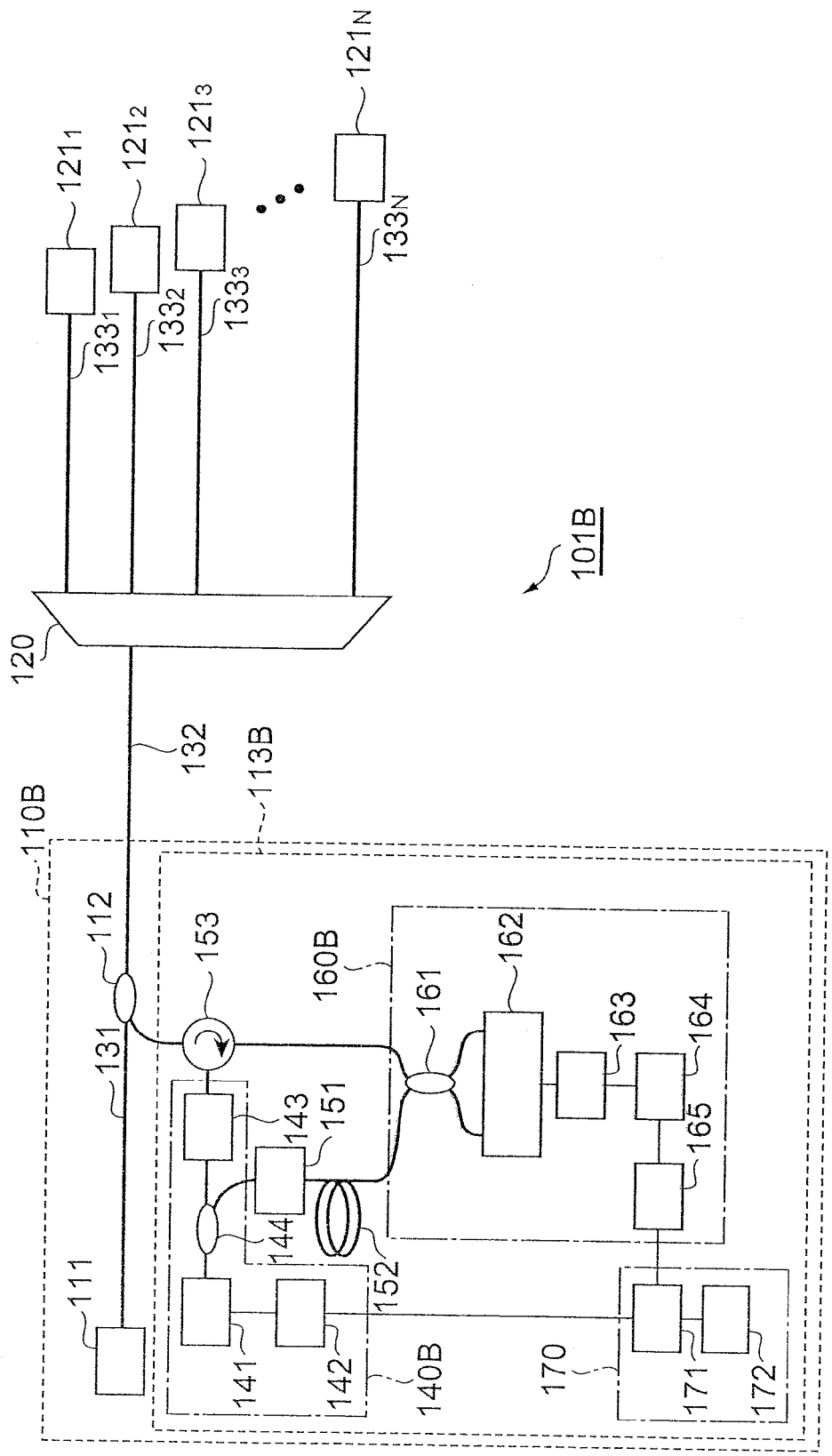
[FIG. 13] is a structural diagram of an optical communication system 101B and optical reflection measurement apparatus 113B in accordance with a fourth embodiment.

FIG. 13 is a structural diagram of an optical communication system 101B and optical reflection measurement apparatus 113B in accordance with the fourth embodiment. The optical communication system 101B in accordance with the fourth embodiment illustrated in FIG. 13 differs from the optical communication system 101A in accordance with the third embodiment illustrated in FIG. 10 in that it comprises a station 110B and an optical reflection measurement apparatus 113B instead of the station 110A and optical reflection measurement apparatus 113A, respectively.

The optical reflection measurement apparatus 113B in FIG. 13 differs from the optical reflection measurement apparatus 113A in FIG. 10 in that it includes a light source section 140B and a measurement section 160B instead of the light source section 140A and measurement section 160A, respectively, and that it further includes an optical circulator 153.

The light source section 140B includes a light source 141, a signal generator 142, an optical modulator 143, and an optical coupler 144. The optical coupler 144 is provided between the light source 141 and optical modulator 143, splits each of the first monitor light and second monitor light emitted from the light source 141 into two, and outputs one of the two branches of light to the optical modulator 143 and the other to the optical modulator 151. The optical modulator 143 inputs therein the light issued from the optical coupler 144, modulates this light, and outputs the modulated light to the optical circulator 153.

The optical circulator 153 inputs therein the light issued from the optical modulator 143 and outputs it to the optical coupler 112. The optical circulator 153 also inputs therein the light issued from the optical coupler 112 and outputs it to the optical coupler 161.

The measurement section 160B includes an optical coupler 161, a balance detector 162, a filter 163, an RF detector 164, and an A/D converter 165. The optical coupler 161 inputs therein the light issued from the optical circulator 153 and the light exiting the optical delay line 152 and outputs them to the balance detector 162.

In the case of OCDR measurement, the first monitor light emitted from the light source 141 travels the optical coupler 144, optical modulator 143, optical circulator 153, and optical coupler 112, so as to propagate through the object to be measured (optical fiber line 132, optical splitter 120, optical fiber line $133_n$, and subscriber terminal $121_n$). The reflected light (constituted by Fresnel reflected light and Rayleigh scattering light) occurring at the time of propagation is fed into the optical coupler 161 through the optical coupler 112 and optical circulator 153. A portion of the first monitor light emitted from the light source 141 is branched out by the optical coupler 144 as reference light. The reference light is fed into the optical coupler 161 through the optical modulator 151 and optical delay line 152. The measurement section 160B and processing section 170 operate as in the third embodiment, thereby yielding the OCDR measurement result.

In the case of OTDR measurement, on the other hand, the second monitor light emitted from the light source 141 travels the optical coupler 144, optical modulator 143, optical circulator 153, and optical coupler 112, so as to propagate through the object to be measured. The reflected light (constituted by Fresnel reflected light and Rayleigh scattering light) occurring at the time of propagation is fed into the optical coupler 161 through the optical coupler 112 and optical circulator 153. A portion of the second monitor light emitted from the light source 141 is branched out by the optical coupler 144 as reference light. The reference light is fed into the optical coupler 161 through the optical modulator 151 and optical delay line 152.

In this embodiment, the balance detector 162 carries out a balance detection operation in the case of OTDR measurement as well. Desirably, the optical modulator 151 shifts the optical frequency of the reference light, and the balance detector 162 carries out heterodyne detection of the second monitor light. This achieves a measurement scheme known as coherent OTDR (C-OTDR), thereby measuring a reflectance distribution.

The processing section 170 performs processing as in the third embodiment. The OCDR and C-OTDR measurement results are processed by the flow of FIG. 12, whereby a high-resolution reflectance distribution measurement result is obtained as illustrated in FIG. 11. Further, this can be employed in PON systems such as 32-branch systems in which the insertion loss at the optical splitter 120 is high, since the C-OTDR can measure shot noise limits by using reference light having a sufficiently high power.

As in the foregoing, the optical reflection measurement apparatus comprises (1) a light source section for selectively outputting one of first monitor light in which an optical frequency is modulated such as to yield a comb-teeth-shaped optical coherence function and pulsed second monitor light and branching out a portion of the first monitor light as reference light; (2) a measurement section for acquiring an OCDR measurement result according to reflected light occurring when the first monitor light emitted from the light source section propagates through an object to be measured and the reference light emitted from the light source section, and an OTDR measurement result according to reflected light occurring when the second monitor light emitted from the light source section propagates through the object; and (3) a processing section for outputting the OCDR and OTDR measurement results acquired by the measurement section in combination with each other. Thus outputting the OCDR and OTDR measurement results in combination with each other can detect discrete reflection points in the object with a high spatial resolution and measure states of segments between the discrete reflection points in the object.

Preferably, in the optical reflection measurement apparatus, the processing section determines a discrete reflection point position in the object according to the OCDR measurement result, finds how much the reflection of the second monitor light at the discrete reflection point contributes to the OCDR measurement result according to the determined discrete reflection point position and the pulse time waveform of the second monitor light, corrects the OTDR measurement result according to thus obtained degree of contribution, and outputs the result of correction. Performing such processing can measure states in the vicinity of discrete reflection points in the object and unify information items concerning the discrete reflection points and the segments between the discrete reflection points.

The optical communication system is one which carries out an optical communication between station- and subscriber-side terminals optically connected to each other with an optical line, the optical communication system comprising an optical coupler provided in the optical line and the above-mentioned optical reflection measurement apparatus optically connected to the optical coupler, wherein the first or second monitor light selectively issued from the optical reflection measurement apparatus is caused to propagate to the optical line through the optical coupler; and wherein reflected light occurring when the first or second monitor light propagates through the optical fiber line is fed into the optical reflection measurement apparatus through the optical coupler. Preferably, in the optical communication system in accordance with the present invention, the station-side terminal is optically connected to a plurality of subscriber terminals through an optical splitter, while an optical coupler is provided in the optical fiber line between the station-side terminal and the optical splitter. Thus using the above-mentioned optical reflection measurement apparatus in the optical communication system can specify locations where failures occur in the subscriber terminals and optical fiber line.

Preferably, in the optical communication system, a plurality of subscriber terminals have respective different optical fiber lengths from the optical splitter. In this case, the subscriber terminals can individually be distinguished from each other.

The above-mentioned optical reflection measurement apparatus and optical communication system can highly accurately detect the Rayleigh scattering light and discrete reflected light occurring in the object to be measured.

MODIFIED EXAMPLES

The present invention can be modified in various manners without being restricted to the above-mentioned embodiments. For example, techniques for suppressing side lobes in the optical coherence function of the first monitor light may be used in combination in the third and fourth embodiments. Hence, assuming that the modulation waveform generated by the signal generator 142 is a sine wave, the light emitted from the light source 141 exhibits acute spectral changes at both end parts of its power spectrum, thereby generating side lobes; for suppressing these side lobes, it is preferable to employ a method of smoothing both end parts of the spectrum with an optical filter or a method of smoothing the spectrum by distorting the modulation waveform.

It is desirable for the third and fourth embodiments to use monitor light having a wavelength different from that of the signal light issued from the station-side terminal 111, thereby preventing the signal light and monitor light from interfering with each other. Since bands of 1.3 µm, 1.49 µm, 1.55 µm, and the like are used as the signal light wavelength, a band of 1.58 to 1.65 µm is preferred as the wavelength of the first or second monitor light. Preferably, as a wavelength multiplexer, the optical coupler 122 minimizes the insertion loss of the signal light and monitor light.

In the third and fourth embodiments, the second monitor light used for the OTDR measurement may be generated by directly modulating the light source 141.

In the third and fourth embodiments, as schematically illustrated in each of FIGS. 10 and 13, it is desirable for the optical fiber lines $133_1$ to $133_N$ to have respective lengths different from each other. It will be preferred in particular if the difference in length among the optical fiber lines $133_n$ is greater than a typical resolution of the OCDR measurement (e.g., 50 cm or more), since discrete reflection points occurring at connection points of the subscriber terminals $121_n$ with the optical fiber lines $133_n$ can be measured discriminately for the respective subscriber terminals. As terminal discrimination means, reflection marker elements having discrete reflection points formed at different periods for the respective subscriber terminals may be inserted between the subscriber terminals $121_n$ and their corresponding optical fiber lines $133_n$.

The third and fourth embodiments may acquire information about the distance from each subscriber terminal to the station by measurement during or after constructing the optical communication system, store the information into the storage section 172, and limit the OCDR measurement range to the vicinity of the stored distance to the subscriber terminal. This makes it possible to monitor in a short time whether or not the optical connection between each subscriber terminal and the station is kept.

REFERENCE SIGNS LIST 1A, 1B . . . optical line monitoring system; 10A, 10B . . . station; 11 . . . station-side terminal; 12 . . . optical coupler; 13 . . . optical switch; 14A, 14B . . . optical line monitoring apparatus; 15 . . . OCDR measurement section; 15B . . . OCDR/OTDR measurement section; 16 . . . OTDR measurement section; 17 . . . control section; 18 . . . storage section; 20 . . . optical splitter; $21_1$ to $21_N$ . . . subscriber terminal; $22_1$ to $22_N$ . . . optical filter; 31, 32, $33_1$ to $33_N$ . . . optical fiber line; 41 . . . light source; 42 . . . intensity modulator; 43 . . . optical splitter; 44 . . . monitor light gate section; 45 . . . optical circulator; 46 . . . polarization modulator; 47 . . . delay optical fiber; 51 . . . optical coupler; 52 . . . balance detector; 53 . . . first filter; 54 . . . electric signal gate section; 55 . . . second filter; 56 . . . RF detector; 57 . . . A/D converter; 61 . . . control section; 62 to 65 . . . signal generator; 66 . . . optical switch; 67 . . . A/D converter; 71 . . . light source; 72 . . . optical circulator; 73 . . . photodetector; 74 . . . A/D converter; 75 . . . control section; 76 . . . signal generator; 101A, 101B . . . optical communication system; 110A, 110B . . . station; 111 . . . station-side terminal; 112 . . . optical coupler; 113A, 113B . . . optical reflection measurement apparatus; 120 . . . optical splitter; $121_1$ to $121_N$ . . . subscriber terminal; 131, 132, $133_1$ to $133_N$ . . . optical fiber line; 140A, 140B . . . light source section; 141 . . . light source; 142 . . . signal generator; 143 . . . optical modulator; 144 . . . optical coupler; 151 . . .

optical modulator; 152 . . . optical delay line; 153 . . . optical circulator; 160A, 160B . . . measurement section; 161 . . . optical coupler; 162 . . . balance detector; 163 . . . filter; 164 . . . RF detector; 165 . . . A/D converter; 166 . . . A/D converter; 170 . . . processing section; 171 . . . control section; 172 . . . storage section

The invention claimed is:

1. An optical line monitoring apparatus comprising:
 first measurement means for propagating first monitor light through an optical line, receiving first reflected light occurring when the first monitor light propagates, and acquiring a reflectance distribution along a light propagation direction in the optical line as a first measurement result by OTDR or OCDR;
 second measurement means for propagating second monitor light through the optical line, receiving second reflected light occurring when the second monitor light propagates, and acquiring a reflectance distribution along the light propagation direction in the optical line as a second measurement result by OCDR; and
 a control section for causing the first measurement means to acquire the first measurement result with a first spatial resolution and then causing the second measurement means to acquire the second measurement result in the range of a portion of the optical line, which is determined according to the first measurement result, with a second spatial resolution smaller than the first spatial resolution;
 wherein the control section determines a position of a discrete reflection point in the optical line according to the second measurement result by detecting a peak within the second measurement result, obtains a degree of contribution of reflection at the discrete reflection point to the first measurement result according to the determined position of the discrete reflection point and the first spatial resolution, corrects the first measurement result according to the obtained degree of contribution, and outputs the corrected result.

2. An optical line monitoring apparatus according to claim 1, wherein a light source section for outputting the first monitor light in the first measurement means and a light source section for outputting the second monitor light in the second measurement means include a common part; and
 wherein a detection section for receiving the first reflected light in the first measurement means and a detection section for receiving the second reflected light in the second measurement means include a common part.

3. An optical line monitoring system for monitoring an optical communication system for carrying out an optical communication between station- and subscriber-side terminals optically connected to each other with an optical line, the optical line monitoring system comprising:
 an optical coupler provided in the optical line and the optical line monitoring apparatus according to claim 1 optically connected to the optical coupler;
 wherein the first or second monitor light selectively issued from the optical line monitoring apparatus is caused to propagate to the optical line through the optical coupler; and
 wherein the first or second reflected light is fed into the optical line monitoring apparatus through the optical coupler.

4. An optical line monitoring system according to claim 3, wherein the station-side terminal is optically connected to a plurality of subscriber terminals through an optical splitter; and
 wherein the optical coupler is provided in the optical line between the station-side terminal and the optical splitter.

5. An optical line monitoring system according to claim 4, wherein each of the plurality of subscriber terminals includes a reflection filter for wavelength-selectively reflecting the first monitor light and second monitor light.

6. An optical line monitoring apparatus comprising:
 a first measurement section that propagates first monitor light through an optical line, receives first reflected light occurring when the first monitor light propagates, and acquires a reflectance distribution along a light propagation direction in the optical line as a first measurement result by OTDR or OCDR;
 a second measurement section that propagates second monitor light through the optical line, receives second reflected light occurring when the second monitor light propagates, and acquires a reflectance distribution along the light propagation direction in the optical line as a second measurement result by OCDR; and
 a control section that causes the first measurement section to acquire the first measurement result with a first spatial resolution and then causes the second measurement section to acquire the second measurement result in the range of a portion of the optical line, which is determined according to the first measurement result, with a second spatial resolution smaller than the first spatial resolution;
 wherein the control section determines a osition of a discrete reflection point in the optical line according to the second measurement result by detecting a peak within the second measurement result, obtains a degree of contribution of reflection at the discrete reflection point to the first measurement result according to the determined iosition of the discrete reflection point and the first spatial resolution, corrects the first measurement result according to the obtained degree of contribution, and outputs the corrected result.

7. An optical line monitoring apparatus according to claim 6, wherein a light source section that outputs the first monitor light in the first measurement section and a light source section that outputs the second monitor light in the second measurement section include a common part; and
 wherein a detection section that receives the first reflected light in the first measurement section and a detection section that receives the second reflected light in the second measurement section include a common part.

* * * * *